United States Patent
Liu et al.

(10) Patent No.: US 11,804,637 B2
(45) Date of Patent: Oct. 31, 2023

(54) BATTERY MODULE, BATTERY PACK, ELECTRIC APPARATUS, AND METHOD AND DEVICE FOR MANUFACTURING BATTERY MODULE

(71) Applicant: Contemporary Amperex Technology Co., Limited, Ningde (CN)

(72) Inventors: Qian Liu, Ningde (CN); Yonghuang Ye, Ningde (CN); Chengdu Liang, Ningde (CN); Haizu Jin, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/890,302

(22) Filed: Aug. 18, 2022

(65) Prior Publication Data
US 2022/0393311 A1   Dec. 8, 2022

Related U.S. Application Data

(63) Continuation of application No. PCT/CN2021/090067, filed on Apr. 26, 2021.

(51) Int. Cl.
*H01M 50/51* (2021.01)
*H01M 50/491* (2021.01)
(Continued)

(52) U.S. Cl.
CPC .......... *H01M 50/51* (2021.01); *H01M 4/505* (2013.01); *H01M 4/525* (2013.01);
(Continued)

(58) Field of Classification Search
None
See application file for complete search history.

(56) References Cited

U.S. PATENT DOCUMENTS

2006/0019164 A1*  1/2006  Bonhomme ...... H01M 10/0525
                                                     429/231.1
2008/0241666 A1*  10/2008  Baba ................... H01M 4/505
                                                     429/231.95
(Continued)

FOREIGN PATENT DOCUMENTS

CN    102027617 A    4/2011
CN    101242011 B    9/2012
(Continued)

OTHER PUBLICATIONS

Landesfeind, Johannes, et al. "Tortuosity Determination of Battery Electrodes and Separators by Impedance Spectroscopy." Journal of The Electrochemical Society, vol. 163, No. 7, Apr. 28, 2016, pp. A1373-A1387, https://doi.org/10.1149/2.1141607jes. (Year: 2016).*

(Continued)

*Primary Examiner* — Robert S Carrico
(74) *Attorney, Agent, or Firm* — East IP P.C.

(57) ABSTRACT

The present application relates to a battery module, comprising a first type of battery cells and a second type of battery cells electrically connected at least in series, wherein the first type of battery cells and the second type of battery cells are battery cells with different chemical systems, the first type of battery cells comprises N first battery cells, the second type of battery cells comprises M second battery cells, N and M are positive integers, the first battery cell comprises a first separator and a first electrolyte, the second battery cell comprises a second separator and a second electrolyte, a kinetic characteristic factor x1 of the first battery cell is: $x1=1000\times(\varepsilon1\times r1)/(\tau1\times t1\times\theta1)$, a kinetic characteristic factor x2 of the second battery cell is: $x2=1000\times(\varepsilon2\times r2)/(\tau2\times t2\times\theta2)$, and x1 and x2 satisfy: $0.01 \leq x1/x2 \leq 160$.

14 Claims, 3 Drawing Sheets

(51) Int. Cl.
  *H01M 50/446* (2021.01)
  *H01M 4/505* (2010.01)
  *H01M 4/525* (2010.01)
  *H01M 4/58* (2010.01)
  *H01M 10/0525* (2010.01)
  *H01M 50/451* (2021.01)
  *H01M 50/411* (2021.01)
  *H01M 50/434* (2021.01)
  *H01M 50/489* (2021.01)
  *H01M 4/02* (2006.01)

(52) U.S. Cl.
  CPC ..... *H01M 4/5825* (2013.01); *H01M 10/0525* (2013.01); *H01M 50/411* (2021.01); *H01M 50/434* (2021.01); *H01M 50/446* (2021.01); *H01M 50/451* (2021.01); *H01M 50/489* (2021.01); *H01M 50/491* (2021.01); *H01M 2004/028* (2013.01); *H01M 2220/20* (2013.01)

(56) References Cited

U.S. PATENT DOCUMENTS

| | | | |
|---|---|---|---|
| 2011/0086248 A1 | 4/2011 | Nakura | |
| 2015/0155541 A1* | 6/2015 | Hasegawa | H01M 50/451 429/144 |
| 2016/0226046 A1* | 8/2016 | Moffat | H01M 8/0239 |
| 2017/0365886 A1* | 12/2017 | Hoshina | H01M 10/0525 |

FOREIGN PATENT DOCUMENTS

| | | |
|---|---|---|
| CN | 105027344 A | 11/2015 |
| CN | 105172606 A | 12/2015 |
| CN | 108630870 A | 10/2018 |
| CN | 208674305 U | 3/2019 |
| CN | 107112603 B | 10/2019 |
| EP | 3644404 A1 | 4/2020 |
| EP | 3952000 A1 | 2/2022 |
| JP | 2003174734 A | 6/2003 |

OTHER PUBLICATIONS

GB/T 31484-2015, Cycle life requirements and test methods for traction battery of electric vehicle, implemented May 15, 2015, 20 pages.
GB/T 21650.2-2008, Pore size distribution and porosity of solid materials by mercury porosimetry and gas adsorption—Part 2:Analysis of mesopores and macropores by gas adsorption, implemented Oct. 1, 2008, 30 pages.
GB/T 19587-2017, Determination of the specific surface area of solids by gas adsorption using the BET method, implemented Apr. 1, 2018, 29 pages.
GB/T 36363-2018, Polyolefin separator for lithium-ion battery, implemented Jan. 1, 2019, 16 pages.
The extended European search report for European Application No. 21856897.0, dated Jan. 23, 2023, 12 pages.
The Partial supplementary European search report for European Application No. 21856897.0, dated Oct. 14, 2022 13 pages.
The International search report for PCT Application No. PCT/CN2021/090067, dated Jan. 29, 2022, 5 pages.

\* cited by examiner

BATTERY MODULE, BATTERY PACK, ELECTRIC APPARATUS, AND METHOD AND DEVICE FOR MANUFACTURING BATTERY MODULE

CROSS-REFERENCES TO RELATED APPLICATIONS

This application is a continuation of International Application No. PCT/CN2021/090067, filed on Apr. 26, 2021, which is hereby incorporated by reference in its entirety.

TECHNICAL FIELD

This application relates to the technical field of energy storage devices, in particular to a battery module, a battery pack, an electric apparatus, a method for manufacturing a battery module, and a device for manufacturing a battery module.

BACKGROUND

Secondary batteries are clean and renewable resources, which can be used as driving energy sources or storage units in vehicles, energy storage and other fields. With the increasing requirements for energy and environmental protection, the application of the secondary batteries has become increasingly popular and widespread. In order to adapt to the needs of different environments and application scenarios, new requirements for the performance of the secondary batteries are put forward in the industry.

In order to improve the safety of secondary batteries in a module, a technical solution of connecting a plurality of individual battery cells with different chemical systems in series and/or in parallel to form a battery module has been proposed. However, for the individual battery cells with different chemical systems, their kinetic characteristics are significantly different. After the battery cells with different electrochemical characteristics are connected in series to form a battery module, due to the cask effect, the rate performance and power performance of the battery module are often limited by the individual battery cells with poor kinetic characteristics, and it is difficult for some battery cells of the battery module to fully exert their electrical performance advantages.

Therefore, how to match the individual battery cells with different chemical systems in the battery module to ensure that the battery module has relatively high rate performance and power performance is an urgent technical problem in the field of secondary batteries.

SUMMARY

As for the key technology of hybrid series battery cells, the existing technology only stays at the conceptual level, and there is no specific implementation instruction on how to match the kinetic characteristics of battery cells with different chemical systems. Particularly, in the prior art, there is no specific implementation instruction on the kinetic characteristics of battery cells and a battery module, the design and matching of separators that are crucial for the kinetic characteristics, etc. Therefore, the performance exertion of the battery cells, the battery module, a battery pack and even an entire vehicle level cannot be truly guaranteed.

The present application is completed in view of the above problems in the prior art, and its objective is to provide a battery module, which includes a first type of battery cells and a second type of battery cells with different chemical systems, wherein the first type of battery cells and the second type of battery cells are electrically connected at least in series. By adjusting multiple parameters of respective separators of the first type of battery cells and the second type of battery cells: comprehensively optimizing many aspects from a substrate to a coating, from a bulk phase to a surface, from a pore structure to an interface contact, etc., to match the kinetic characteristics of first battery cells and second battery cells, the rate performance and power performance of the battery module are improved.

A first aspect of the present application provides a battery module, including a first type of battery cells and a second type of battery cells electrically connected at least in series, wherein the first type of battery cells and the second type of battery cells are battery cells with different chemical systems, the first type of battery cells includes N first battery cells, the second type of battery cells includes M second battery cells, N and M are positive integers, the first battery cell includes a first separator and a first electrolyte, the second battery cell includes a second separator and a second electrolyte, a kinetic characteristic factor $x1$ of the first battery cell is: $x1=1000\times(\varepsilon1\times r1)/(\tau1\times t1\times\theta1)$, a kinetic characteristic factor $x2$ of the second battery cell is: $x2=1000\times(\varepsilon2\times r2)/(\tau2\times t2\times\theta2)$, and $x1$ and $x2$ satisfy: $0.01\leq x1/x2\leq160$, where $\varepsilon1$ and $\varepsilon2$ are respectively a porosity of the first separator and a porosity of the second separator, in %; $r1$ and $r2$ are respectively an average pore diameter of the first separator and an average pore diameter of the second separator, in μm; $\tau1$ and $\tau2$ are respectively a tortuosity of the first separator and a tortuosity of the second separator; $t1$ and $t2$ are respectively an average thickness of the first separator and an average thickness of the second separator, in μm; $\theta1$ is a contact angle between the first separator and the first electrolyte, in radians; and $\theta2$ is a contact angle between the second separator and the second electrolyte, in radians.

In any embodiment of the present application, the first battery cell and the second battery cell satisfy: $0.1\leq x1/x2\leq100$. Optionally, $0.3\leq x1/x2\leq60$. Further optionally, $0.5\leq x1/x2\leq15$.

In any embodiment of the present application, the first battery cell and the second battery cell satisfy: $0.3\leq x1\leq95$, and/or $0.2\leq x2\leq55$. Optionally, $0.5\leq x1\leq40$, and/or $0.5\leq x2\leq35$. Further optionally, $1\leq x1\leq20$, and/or $1\leq x2\leq20$.

In any embodiment of the present application, the average thickness $t1$ of the first separator and the average thickness $t2$ of the second separator satisfy: $4\ \mu m\leq t1\leq20\ \mu m$, and/or $8\ \mu m\leq t2\leq16\ \mu m$. Optionally, $7\ \mu m\leq t1\leq10\ \mu m$, and/or $11\ \mu m\leq t2\leq14\ \mu m$.

In any embodiment of the present application, the average pore diameter $r1$ of the first separator and the average pore diameter $r2$ of the second separator satisfy: $0.01\ \mu m\leq r1\leq3\ \mu m$, and/or $0.01\ \mu m\leq r2\leq2\ \mu m$. Optionally, $0.03\ \mu m\leq r1\leq1.2\ \mu m$, and/or $0.03\ \mu m\ r2\leq1\ \mu m$.

In any embodiment of the present application, the porosity $\varepsilon1$ of the first separator and the porosity $\varepsilon2$ of the second separator satisfy: $25\%\leq\varepsilon1\leq60\%$, and/or $25\%\leq\varepsilon2\leq60\%$. Optionally, $30\%\leq\varepsilon\leq50\%$, and/or $30\%\leq\varepsilon2\leq50\%$.

In any embodiment of the present application, the tortuosity $\tau i$ of the first separator and the tortuosity $\tau2$ of the second separator satisfy: $1.1\leq\tau1\leq3.9$, and/or $1.1\leq\tau2\leq3.9$. Optionally, $1.3\leq\tau1\leq3$, and/or $1.3\leq\tau2\leq3$.

In any embodiment of the present application, the contact angle $\theta1$ between the first separator and the first electrolyte, and the contact angle θ2 between the second separator and the second electrolyte satisfy: 0.35≤θ1≤1.35, and/or 0.35≤θ2≤1.35, in radians.

In any embodiment of the present application, in the first battery cell, the first separator includes a first substrate and a first coating disposed on at least one surface of the first substrate; in the second battery cell, the second separator includes a second substrate and a second coating disposed on at least one surface of the second substrate, and at least one of the following conditions is satisfied:
(1) the first substrate has a thickness of 3 μm to 19.5 μm; and/or the second substrate has a thickness of 4 μm to 15 μm;
(2) the first coating on one side has a thickness of 0.05 μm to 2 μm; and/or the second coating on one side has a thickness of 0.25 μm to 3.5 μm;
(3) the first coating contains inorganic particles, and the inorganic particles are one or more selected from boehmite (γ-AlOOH), aluminum oxide ($Al_2O_3$), barium sulfate ($BaSO_4$), magnesium oxide (MgO), magnesium hydroxide ($Mg(OH)_2$), silicon dioxide ($SiO_2$), tin dioxide ($SnO_2$), titanium oxide ($TiO_2$), calcium oxide (CaO), zinc oxide (ZnO), zirconium oxide ($ZrO_2$), yttrium oxide ($Y_2O_3$), nickel oxide (NiO), cerium oxide ($CeO_2$), zirconium titanate ($SrTiO_3$), barium titanate ($BaTiO_3$), and magnesium fluoride ($MgF_2$); and optionally, based on a weight of the first coating the inorganic particles have a weight percentage of 50% to 99%, and optionally 70% to 90%; and
(4) the second coating contains at least organic particles, and the organic particles are one or more selected from polytetrafluoroethylene, polyvinylidene fluoride, polychlorotrifluoroethylene, polyvinylidene fluoride, modified polyvinylidene fluoride, vinylidene fluoride-hexafluoropropylene copolymer, polyethylene, polypropylene, polyacrylonitrile, polyethylene oxide, acrylate, polymethyl methacrylate, polyacrylonitrile, ethyl cellulose, copolymers of different fluorine-containing alkenyl monomer units, copolymers of fluorine-containing alkenyl monomer units and olefin-based monomer units, copolymers of fluorine-containing alkenyl monomer units and acrylic monomer units, copolymers of fluorine-containing alkenyl monomer units and acrylate monomer units, and modified compounds of the above homopolymers or copolymers; and optionally, based on a weight of the second coating the organic particles have a weight percentage of 30% to 99%, and optionally 50% to 90%.

In any embodiment of the present application, in the first battery cell, the first coating is disposed on both upper and lower surfaces of the first substrate.

In any embodiment of the present application, in the second battery cell, the second coating is disposed on both upper and lower surfaces of the second substrate.

In any embodiment of the present application, a positive electrode active material for the first battery cell includes at least one of a lithium-containing phosphate represented by formula (I) or a lithium manganese-based oxide represented by formula (II),

$$LiFe_{1-x2-y2}Mn_{x2}M'_{y2}PO_4 \quad \text{formula (I)}$$

$$Li_{1+x3}Mn_eN_{2-e}O_{4-d}B_d \quad \text{formula (II)}$$

wherein in formula (I), 0≤x2≤1, 0≤y2≤0.1, and M' is one or more selected from transition metal elements and non-transition metal elements other than Fe and Mn; and in formula (II), −0.1≤x3≤0.2, 0≤e≤2, 0≤d<1, N is one or more of Ni, Fe, Cr, Ti, Zn, V, Al, Mg, Zr and Ce, and B is one or more of S, N, F, Cl, Br and I.

In any embodiment of the present application, the positive electrode active material for the first battery cell includes one or more of $LiFePO_4$, $LiMnPO_4$, $LiMn_{1-x3}Fe_{x3}PO_4$, $LiV_{1-x3}Fe_{x3}PO_4$, $LiMn_2O_4$, and $LiMn_{1.9}Al_{0.1}O_4$, where x3 independently satisfies 0<x3<1.

In any embodiment of the present application, based on 100% weight of the positive electrode active material for the first battery cell, at least one of the lithium-containing phosphate represented by formula (I) or the lithium manganese-based oxide represented by formula (II) has a weight percentage of not less than 70%.

In any embodiment of the present application, a positive electrode active material for the second battery cell includes a lithium transition metal oxide represented by formula (III),

$$Li_{1+x1}Ni_aCo_bM_{1-a-b}O_{2-y1}A_{y1} \quad \text{formula (III)}$$

where −0.1≤x1≤0.2, 0.3≤a<0.95, 0<b<0.2, 0<a+b<1, 0≤y1<0.2, M is one or more selected from Mn, Fe, Cr, Ti, Zn, V, Al, Zr and Ce, and A is one or more selected from S, F, Cl and I; and optionally, 0.5≤a<0.95, and 0<b<0.15.

In any embodiment of the present application, based on 100% weight of the positive electrode active material for the second battery cell, the lithium transition metal oxide represented by formula (III) has a weight percentage of not less than 70%.

A second aspect of the present application provides a battery pack, including the battery module described in the first aspect.

A third aspect of the present application provides an electric apparatus, including the battery module described in the first aspect or the battery pack described in the second aspect, wherein the battery module or the battery pack is used as a power source or an energy storage unit of the electric apparatus.

A fourth aspect of the present application provides a method for manufacturing a battery module, including the following steps: obtaining a first type of battery cells and a second type of battery cells, wherein the first type of battery cells and the second type of battery cells are battery cells with different chemical systems, the first type of battery cells includes N first battery cells, the second type of battery cells includes M second battery cells, N and M are positive integers, the first battery cell includes a first separator and a first electrolyte, the second battery cell includes a second separator and a second electrolyte, a kinetic characteristic factor x1 of the first battery cell is: x1=1000×(ε1×r1)/(τ1×t1×θ1), a kinetic characteristic factor x2 of the second battery cell is: x2=1000×(ε2×r2)/(τ2×t2×θ2), and x1 and x2 satisfy: 0.01≤x1/x2≤160, where ε1 and ε2 are respectively a porosity of the first separator and a porosity of the second separator, in %; r1 and r2 are respectively an average pore diameter of the first separator and an average pore diameter of the second separator, in μm; τ1 and τ2 are respectively a tortuosity of the first separator and a tortuosity of the second separator; t1 and t2 are respectively an average thickness of the first separator and an average thickness of the second separator, in μm; θ1 is a contact angle between the first separator and the first electrolyte, in radians; θ2 is a contact angle between the second separator and the second electrolyte, in radians; and electrically connecting the first type of battery cells and the second type of battery cells in series to form the battery module described in the first aspect.

A fifth aspect of the present application provides a device for manufacturing a battery module, including: a clamping arm unit, wherein the clamping arm unit is configured to obtain a first type of battery cells and a second type of battery cells, the first type of battery cells and the second type of battery cells are battery cells with different chemical systems, the first type of battery cells includes N first battery cells, the second type of battery cells includes M second battery cells, N and M are positive integers, the first battery cell includes a first separator and a first electrolyte, the second battery cell includes a second separator and a second electrolyte, a kinetic characteristic factor x1 of the first battery cell is: $x1=1000\times(\epsilon1\times r1)/(\tau1\times t1\times\theta1)$, a kinetic characteristic factor x2 of the second battery cell is: $x2=1000\times(\epsilon2\times r2)/(\tau2\times t2\times\theta2)$, and x1 and x2 satisfy: $0.01 \leq x1/x2 \leq 160$, where $\epsilon1$ and $\epsilon2$ are respectively a porosity of the first separator and a porosity of the second separator, in %;

r1 and r2 are respectively an average pore diameter of the first separator and an average pore diameter of the second separator, in μm;

$\tau1$ and $\tau2$ are respectively a tortuosity of the first separator and a tortuosity of the second separator;

t1 and t2 are respectively an average thickness of the first separator and an average thickness of the second separator, in μm;

$\theta1$ is a contact angle between the first separator and the first electrolyte, in radians;

$\theta2$ is a contact angle between the second separator and the second electrolyte, in radians;

an assembling unit, configured to electrically connect the first type of battery cells and the second type of battery cells at least in series to form the battery module described in the first aspect; and a control unit, configured to control the clamping arm unit and the assembling unit.

Technical Effect

In the present application, the battery module includes battery cells with different chemical systems, and by matching kinetic factors of first battery cells and second battery cells, for example, comprehensively optimizing a number of key technical indicators of separators including substrates and coatings, from a bulk phase to a surface, from a pore structure to an interface contact, etc., matched kinetic characteristics of the first battery cells and the second battery cells are ensured, thereby improving the rate performance and power performance of the battery module.

Since the battery pack and the electric apparatus in the present application include the battery module, they have at least the same technical advantages as the battery module.

Figure 1:
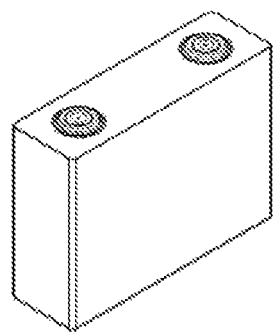
FIG. 1 is a schematic diagram showing an example of a battery cell of the present application.

5, 5a, 5b battery cell
51 shell
52 electrode assembly
53 cover plate
4 battery module
1 battery pack
2 upper box body
3 lower box body

DETAILED DESCRIPTION

The "range" disclosed herein is defined in the form of a lower limit and an upper limit. A given range is defined by selecting a lower limit and an upper limit, and the selected lower limit and upper limit define the boundaries of a particular range. The range defined in this way can include or exclude end values, and can be combined arbitrarily, that is, any lower limit can be combined with any upper limit to form a range. For example, if a range of 60-120 and a range of 80-110 are listed for a specific parameter, it is understood that the ranges of 60-110 and 80-120 are also expected. In addition, if minimum range values 1 and 2 are listed and if maximum range values 3, 4 and 5 are listed, the following ranges can all be expected: 1-3, 1-4, 1-5, 2-3, 2-4 and 2-5. In the present application, unless otherwise specified, the numerical range "a-b" represents an abbreviation of any combination of real numbers between a and b, where both a and b are real numbers. For example, the numerical range "0-5" represents all real numbers "0-5" listed herein, and "0-5" is only an abbreviation of a combination of these values. In addition, when a parameter is expressed as an integer $\geq 2$, it is equivalent to disclosing that the parameter is, for example, an integer 2, 3, 4, 5, 6, 7, 8, 9, 10, 11, 12, etc.

In the present application, unless otherwise specified, all the embodiments and preferred embodiments mentioned herein can be combined with each other to form new technical solutions.

In the present application, unless otherwise specified, all the technical features and preferred features mentioned herein can be combined with each other to form new technical solutions.

In the present application, unless otherwise specified, all the steps mentioned herein can be carried out sequentially or randomly, but preferably carried out sequentially. For example, the method includes steps (a) and (b), which represents that the method may include steps (a) and (b) performed sequentially, or may include steps (b) and (a) performed sequentially. For example, the method may further include step (c), which represents that step (c) may be added to the method in any order, for example, the method may include steps (a), (b) and (c), or steps (a), (c) and (b), or steps (c), (a) and (b).

In the present application, unless otherwise specified, the expressions "comprise" and "include" mentioned herein are open-ended or closed-ended. For example, the expression "comprise" and "include" may comprise or include other components that are not listed, or comprise or include only the listed components.

In the description herein, it should be noted that, unless otherwise specified, a numeric range described with the term "above" or "below" includes the lower or upper limit itself, and "more" in "one or more" means two or more.

In the description herein, unless otherwise specified, the term "or" is inclusive. For example, the phrase "A or B" means "A, B, or both A and B". More specifically, any of the following conditions satisfy the condition "A or B": A is true (or exists) and B is false (or does not exist); A is false (or does not exist) and B is true (or exists); or both A and B are true (or exist).

[Battery Cell]

In the present application, the "battery cell" refers to a battery unit that can be independently charged and discharged. The battery cell includes a positive electrode plate, a negative electrode plate, a separator, an electrolyte, and an outer package for packaging the positive electrode plate, the negative electrode plate, the separator and the electrolyte. The type and shape of the battery cell are not particularly limited in the present application, and the battery cell may be various types of battery cells, such as a soft-packed battery cell, a cylindrical battery cell, or a square battery cell. The battery cell in the present application may be a lithium ion battery cell, a potassium ion battery cell, a sodium ion battery cell, a lithium sulfur battery cell, etc., and the lithium ion battery cell is particularly preferred. During charge and discharge of the battery unit, active ions are repeatedly intercalated and deintercalated between the positive electrode plate and the negative electrode plate. The electrolyte helps the conduction of ions between the positive electrode plate and the negative electrode plate.

In the present application, the "battery cell" refers to a battery unit that can be independently charged and discharged. The components of the battery cell may include a positive electrode plate, a negative electrode plate, a separator, an electrolyte, and an outer package for packaging the positive electrode plate, the negative electrode plate, the separator and the electrolyte. The type and shape of the battery cell are not particularly limited in the present application, and the battery cell may be various types of battery cells, such as a soft-packed battery cell, a cylindrical battery cell, or a square battery cell. The battery cell in the present application may be a lithium ion battery cell, a potassium ion battery cell, a sodium ion battery cell, a lithium sulfur battery cell, etc., and the lithium ion battery cell is particularly preferred. During charge and discharge of the battery, active ions are repeatedly intercalated and deintercalated between the positive electrode plate and the negative electrode plate. The electrolyte helps the conduction of ions between the positive electrode plate and the negative electrode plate.

In the present application, the "chemical system" of the battery cell is classified according to the components of a positive electrode active material used in the positive electrode plate of the battery cell, without limitation on the elements or substances that are doped in or applied on the positive electrode active material. For example, the battery cell in which positive electrode active material is lithium iron phosphate (including those doped with Mn or V elements) may be defined as a battery cell with a lithium iron phosphate chemical system. The battery cell in which positive electrode active material is lithium nickel cobalt manganate (generally referred to as NCM) may be defined as a battery cell with a NCM chemical system. Further, the chemical system of the battery cell may be further limited based on the relative content of nickel, cobalt, and manganese in the positive electrode active material. For example, the battery cell in which positive electrode active material is $LiNi_{0.5}Co_{0.2}Mn_{0.3}O_2$ (generally referred to as NCM523) may be defined as a battery cell with a NCM523 chemical system, the battery cell in which positive electrode active material is $LiNi_{0.6}Co_{0.2}Mn_{0.2}O_2$ (generally referred to as NCM622) may be defined as a battery cell with a NCM622 chemical system, and the battery cell in which positive electrode active material is $LiNi_{0.8}Co_{0.1}Mn_{0.1}O_2$ (generally referred to as NCM811) may be defined as a battery cell with a NCM811 chemical system. The battery cell with lithium nickel cobalt aluminate system (generally referred to as NCA) as a positive electrode material may be defined as a battery cell with a NCA chemical system. In addition, in the present application, a battery cell with a hybrid system may be used, for example, a battery cell with a hybrid system including NCM and NCA.

Hereinafter, first, the basic structures of the separator, the positive electrode plate, the negative electrode plate, and the electrolyte of the battery cell in the present application will be described.

<Separator>

In some embodiments of the present application, the battery cell includes a separator, the separator separates the positive electrode plate and the negative electrode plate of the battery cell and provides selective permeation or blocking of materials with different types, sizes, and charges in the system, for example, the separator can insulate electrons, physically separate positive electrode active materials from negative electrode active materials of the battery cell to prevent internal short circuits and help formation of an electric field in a certain direction, and enable the ions in the battery to pass through the separator and move between positive and negative electrodes.

In some embodiments of the present application, the separator may be prepared in the following way: (1) providing a substrate; (2) providing a coating slurry including a component material, a binder and a solvent, and the component material includes inorganic particles and/or organic particles; and (3) applying the coating slurry described in step (2) on at least one side of the substrate described in step (1) to form a coating, and drying the coating to obtain the separator.

<Positive Electrode Plate>

In the battery cell of the present application, the positive electrode plate includes a positive electrode current collector and a positive electrode film disposed on at least one surface of the positive electrode current collector, the positive electrode film including a positive electrode active material. For example, the positive electrode current collector has two opposite surfaces in its thickness direction, and the positive electrode film is disposed on either or both of the two opposite surfaces of the positive electrode current collector. In the battery cell of the present application, the positive electrode current collector may be a metal foil or a composite current collector. For example, the metal foil may be an aluminum foil, and the composite current collector may include a polymer material base layer and a metal layer formed on at least one surface of the polymer material base layer. The composite current collector may be formed by forming a metal material (aluminum, aluminum alloy, nickel, nickel alloy, titanium, titanium alloy, silver and silver alloy) on a polymer material substrate (such as substrates of polypropylene (PP), polyethylene terephthalate (PET), polybutylene terephthalate (PBT), polystyrene (PS), polyethylene (PE) and copolymers thereof).

In the battery cell of the present application, the positive electrode active material may be a positive electrode active material used for a battery cell known in the art. For example, the positive electrode active material may include one or more of the following: an olivine structured lithium-containing phosphate, a lithium transition metal oxide, and respective modified compounds thereof. However, the material in the present application is not limited to these materials, and other traditional materials that can be used as positive electrode active materials for battery cells can also be used. These positive electrode active materials may be used alone, or two or more of them may be used together. Examples of the lithium transition metal oxide may include, but are not limited to, one or more of a lithium cobalt oxide (such as $LiCoO_2$), a lithium nickel oxide (such as $LiNiO_2$), a lithium manganese oxide (such as $LiMnO_2$ and $LiMn_2O_4$), a lithium nickel cobalt oxide, a lithium manganese cobalt oxide, a lithium nickel manganese oxide, a lithium nickel cobalt manganese oxide (such as $LiNi_{1/3}Co_{1/3}Mn_{1/3}O_2$ (NCM333), $LiNi_{0.5}Co_{0.2}Mn_{0.3}O_2$ (NCM523), $LiNi_{0.5}Co_{0.25}Mn_{0.25}O_2$ (NCM211), $LiNi_{0.6}Co_{0.2}Mn_{0.2}O_2$ (NCM622), and $LiNi_{0.8}Co_{0.1}Mn_{0.1}O_2$ (NCM811)), a lithium nickel cobalt aluminum oxide (such as $LiNi_{0.85}Co_{0.15}Al_{0.05}O_2$), and modified compounds thereof. Examples of the olivine structured lithium-containing phosphate may include, but are not limited to, one or more of a lithium iron phosphate (such as $LiFePO_4$ (LFP)), a composite material of lithium iron phosphate and carbon, a lithium manganese phosphate (such as $LiMnPO_4$), a composite material of lithium manganese phosphate and carbon, a lithium iron manganese phosphate, and a composite material of lithium iron manganese phosphate and carbon.

In some embodiments, the positive electrode film may further optionally include a binder. Non-limiting examples of the binder that can be used in the positive electrode film may include one or more of the following: polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer and fluorinated acrylate resin.

In some embodiments, the positive electrode film may further optionally include a conductive agent. Examples of the conductive agent used in the positive electrode film may include one or more of superconducting carbon, acetylene black, carbon black, Ketjen black, carbon dots, carbon nanotubes, graphene, and carbon nanofibers.

In some embodiments of the present application, a positive electrode can be prepared by the following way: the above-mentioned components for preparing the positive electrode, such as the positive electrode active material, the conductive agent, the binder, and any other components, are dispersed in a solvent (such as N-methylpyrrolidone) to form a uniform positive electrode slurry; and the positive electrode slurry is applied on the positive electrode current collector, and after process including drying and cold-pressing, the positive electrode plate can be obtained.

<Negative Electrode Plate>

The battery cell of the present application includes a negative electrode plate, the negative electrode plate includes a negative electrode current collector and a negative electrode film disposed on at least one surface of the negative electrode current collector, and the negative electrode film includes a negative electrode active material.

In some embodiments of the present application, the negative electrode active material in the negative electrode film may be a negative electrode active material commonly used in the art, such as one or more of natural graphite, artificial graphite, soft carbon, hard carbon, a silicon-based material, a tin-based material, and lithium titanate. The silicon-based material may be one or more selected from elemental silicon, a silicon oxide, and a silicon-carbon composite. The tin-based material may be one or more selected from elemental tin, a tin oxide, and a tin alloy.

In the battery cell of the present application, in addition to the negative electrode active material, the negative electrode film may further include an optional binder, an optional conductive agent, and other optional additives. The negative electrode film of the present application is usually formed by applying and drying a negative electrode slurry. The negative electrode slurry is usually formed by dispersing the negative electrode active material and the optional conductive agent and binder in a solvent and stirring the same uniformly. The solvent may be N-methylpyrrolidone (NMP) or deionized water.

As an example, the conductive agent may include one or more of superconducting carbon, carbon black (such as acetylene black, or Ketjenblack), carbon dots, carbon nanotubes, graphene and carbon nanofibers.

As an example, the binder may include one or more of styrene butadiene rubber (SBR), water-soluble unsaturated resin SR-1B, polyacrylic acid (PAA), polyacrylic acid sodium (PAAS), polyacrylamide (PAM), polyvinyl alcohol (PVA), sodium alginate (SA) and carboxymethyl chitosan (CMCS). As an example, the binder may include one or more of styrene-butadiene rubber (SBR), polyvinyl alcohol (PVA), sodium alginate (SA), polymethacrylic acid (PMAA) and carboxymethyl chitosan (CMCS). The other optional additives are, for example, a thickener (such as sodium carboxymethyl cellulose CMC-Na), a PTC thermistor material, etc.

In addition, in the battery cell of the present application, the negative electrode plate does not exclude other additional functional layers other than the negative electrode film. For example, in some embodiments, the negative electrode plate of the present application may further include a conductive undercoat (for example, composed of a conductive agent and a binder) sandwiched between the negative electrode current collector and a first negative electrode film and disposed on the surface of the negative electrode current collector. In some other embodiments, the negative electrode plate of the present application may further include a covering protective layer that covers the surface of a second negative electrode film.

In the battery cell of the present application, the negative electrode current collector may be a metal foil or a composite current collector. For example, the metal foil may be a copper foil, a silver foil, an iron foil, or a foil composed of an alloy of the foregoing metals. The composite current collector may include a polymer material base layer and a metal layer formed on at least one surface of the polymer material base layer, and may be formed by forming a metal material (copper, copper alloy, nickel, nickel alloy, titanium, titanium alloy, silver and silver alloy, etc.) on the polymer material base layer (such as a base layer prepared from polypropylene (PP), polyethylene terephthalate (PET), polybutylene terephthalate (PBT), polystyrene (PS), polyethylene (PE) and copolymers thereof).

<Electrolyte>

The electrolyte helps the conduction of ions between the positive electrode plate and the negative electrode plate. The electrolyte includes an electrolyte salt and a solvent. In some embodiments, the electrolyte salt may be one or more selected from lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bisfluorosulfonimide (LiFSI), lithium bistrifluoromethanesulfonimide (LiTFSI), lithium trifluoromethanesulfonate (LiTFS), lithium difluorooxalate (LiDFOB), lithium bisoxalate (Li- BOB), lithium difluorophosphate ($LiPO_2F_2$), lithium difluorobisoxalate phosphate (LiDFOP) and lithium tetrafluorooxalate phosphate (LiTFOP).

In some embodiments of the present application, the solvent may be one or more selected from the following: ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethylene propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), ethyl methyl sulfone (EMS), and ethylsulfonylethane (ESE).

In some embodiments of the present application, based on a total weight of the electrolyte, a content of the solvent is 60-99 wt %, such as 65-95 wt %, or 70-90 wt %, or 75-89 wt %, or 80-85 wt %. In some embodiments of the present application, based on a total weight of the electrolyte, a content of the electrolyte is 1-40 wt %, such as 5-35 wt %, or 10-30 wt %, or 11-25 wt %, or 15-20 wt %.

In some embodiments of the present application, the electrolyte may further optionally include an additive. For example, the additive may include one or more of the following: a negative electrode film-forming additive, a positive electrode film-forming additive, and an additive that can improve certain performance of the battery, such as an additive that improves the overcharge performance of the battery, an additive that improves the high-temperature performance of the battery, and an additive that improves the low-temperature performance of the battery.

In some embodiments of the present application, the above-mentioned positive electrode plate, negative electrode plate and separator can be made into an electrode assembly/bare cell through a winding process or a lamination process.

In some embodiments of the present application, the battery cell further includes an outer package, and the outer package can be used to package the above-mentioned electrode assembly and electrolyte. In some embodiments, the outer package of the battery cell may be a hard case, such as a hard plastic case, an aluminum case, or a steel case. In other embodiments, the outer package of the battery cell may be a soft bag, such as a pocket type soft bag. The material of the soft bag may be plastic, such as one or more of polypropylene (PP), polybutylene terephthalate (PBT), and polybutylene succinate (PBS).

Figure 2:
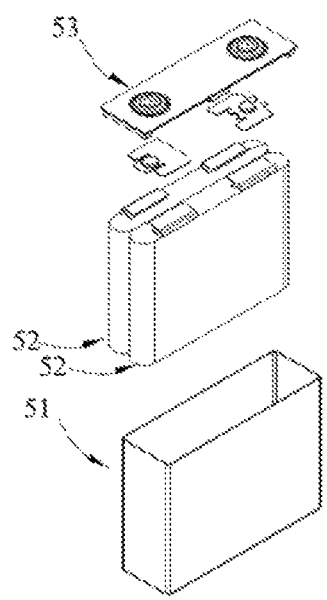
FIG. 2 is an exploded view showing an example of the battery cell of the present application shown in FIG. 1.

FIG. 1 is a schematic diagram showing an example of a battery cell 5 of the present application. FIG. 2 is an exploded view showing an example of the battery cell 5 of the present application shown in FIG. 1.

The outer package may include a shell 51 and a cover plate 53, the shell 51 may include a bottom plate and side plates connected to the bottom plate, and the bottom plate and the side plates enclose a receiving cavity. The shell 51 has an opening communicated with the receiving cavity, and the cover plate 53 can cover the opening to close the receiving cavity. The positive electrode plate, the negative electrode plate and the separator can form an electrode assembly 52 through a winding process or a lamination process, the electrode assembly is packaged in the receiving cavity, and the electrolyte infiltrates the electrode assembly 52. The number of electrode assemblies 52 included in the battery cell 5 may be one or more.

[Battery Module]

In the present application, the "battery module" is formed by electrically connecting a certain number of battery cells together and putting them into a frame in order to protect the battery cells from external impact, heat, vibration, etc. The shape of the battery cell of the present application may be cylindrical, square, or in other arbitrary shapes.

In the present application, several battery cells can be assembled together to form a battery module, the battery module includes two or more battery cells, and the specific number depends on the application of the battery module and the parameters of a single battery module.

Figure 3:
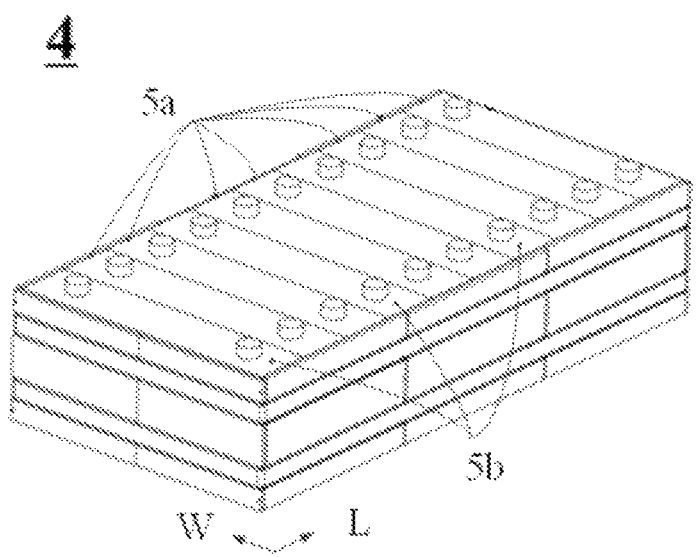
FIG. 3 is a schematic diagram showing an example of a battery module of the present application.

FIG. 3 is a schematic diagram showing an example of a battery module of the present application. Referring to FIG. 3, in the battery module 4, a plurality of battery cells 5a and 5b may be arranged sequentially in a length direction of the battery module 4 (5a may be first battery cells, and 5b may be second battery cells). Apparently, they may also be arranged in any other way. Further, the plurality of battery cells 5a and 5b can be fixed by fasteners. Optionally, the battery module 4 may further include a housing having a receiving space in which the plurality of battery cells 5a and 5b are received.

<Regarding the Design of Kinetic Characteristic Factors of the First Battery Cell and the Second Battery Cell>

In some embodiments of the present application, a battery module includes a first type of battery cells and a second type of battery cells electrically connected at least in series, the first type of battery cells and the second type of battery cells are battery cells with different chemical systems, the first type of battery cells includes N first battery cells, the second type of battery cells includes M second battery cells, N and M are positive integers, the first battery cell includes a first separator and a first electrolyte, the second battery cell includes a second separator and a second electrolyte, a kinetic characteristic factor $x1$ of the first battery cell is: $x1=1000\times(\varepsilon1\times r1)/(\tau1\times t1\times\theta1)$, a kinetic characteristic factor $x2$ of the second battery cell is: $x2=1000\times(\varepsilon2\times r2)/(\tau2\times t2\times\theta2)$, and $x1$ and $x2$ satisfy: $0.01\leq x1/x2\leq160$, where $\varepsilon1$ and $\varepsilon2$ are respectively a porosity of the first separator and a porosity of the second separator, in %; $r1$ and $r2$ are respectively an average pore diameter of the first separator and an average pore diameter of the second separator, in μm; $\tau1$ and $\tau2$ are respectively a tortuosity of the first separator and a tortuosity of the second separator; $t1$ and $t2$ are respectively an average thickness of the first separator and an average thickness of the second separator, in μm; $\theta1$ is a contact angle between the first separator and the first electrolyte, in radians; and $\theta2$ is a contact angle between the second separator and the second electrolyte, in radians.

In order to be able to assemble battery cells with different chemical systems more accurately to form a battery module with large capacity and high kinetic characteristics, the inventors of the present application use kinetic characteristic factors of the battery cells to characterize migration capabilities of active ions in the battery cells during charging and discharging. By matching the kinetic factors of the battery cells with different chemical systems, the cask effect after different types of battery cells form a module is overcome, and the overall rate performance and power performance of the battery module are improved. In the present application, the kinetic factor of the battery cell is obtained after comprehensive consideration of five key parameters including the thickness, pore diameter, porosity, and tortuosity of the separator and the wettability of the electrolyte in the separator. The inventors of the present application have discovered through dedicated research that a great kinetic property difference is present among the battery cells with different chemical systems, and if their kinetic properties are not adjusted adaptively, the rate performance and power performance of the battery module comprising hybrid battery cell in series will be greatly affected. Therefore, the ratio of the kinetic characteristic factors of the separators of the two types of battery cells should be within a certain range.

In some embodiments of the present application, the first battery cell and the second battery cell further satisfy: $0.1 \leq x1/x2 \leq 100$. Optionally, $0.3 \leq x1/x2 \leq 60$. Further optionally, $0.5 \leq x1/x2 \leq 15$. Specifically, x1/x2 may be 0.01, 0.05, 0.1, 0.15, 0.2, 0.25, 0.3, 0.35, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, or its value is within a range obtained by combining any two of the above values. In the present application, when the ratio of the kinetic factors of the first battery cell and the second battery cell is within the above range, the direct current impedance of the battery module can be further reduced, which helps overcome the cask effect of the battery cell module with different types of chemical systems, improves the consistency of kinetic characteristics of multiple types of battery cells in the battery module, and improves the rate performance and power performance of the battery module.

In some embodiments of the present application, the kinetic factor x1 of the first battery cell satisfies: $0.3 \leq x1 \leq 95$. Optionally, $0.5 \leq x1 < 40$. Further optionally, $1 \leq x1 \leq 20$. Specifically, x1 may be 0.3, 0.35, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, or its value is within a range obtained by combining any two of the above values.

In some embodiments of the present application, the kinetic factor x2 of the second battery cell satisfies: $0.2 \leq x2 \leq 55$. Optionally, $0.5 \leq x2 \leq 35$. Further optionally, $1 \leq x2 \leq 20$. Specifically, x2 may be 0.2, 0.25, 0.3, 0.35, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, or its value is within a range obtained by combining any two of the above values.

In some embodiments of the present application, the average thickness t1 of the first separator and the average thickness t2 of the second separator satisfy: $4\ \mu m \leq t1 \leq 20\ \mu m$, and/or $8\ \mu m \leq t2 \leq 16\ \mu m$. Optionally, $7\ \mu m \leq t1 \leq 10\ \mu m$, and/or $11\ \mu m \leq t2 \leq 14\ \mu m$. Specifically, the average thickness t1 of the first separator may be 4 µm, 5 µm, 6 µm, 7 µm, 8 µm, 9 µm, 10 µm, 11 µm, 12 µm, 13 µm, 14 µm, 15 µm, 16 µm, 17 µm, 18 µm, 19 µm, 20 µm, or its value is within a range obtained by combining any two of the above values. The average thickness t2 of the second separator may be 8 µm, 8.5 µm, 9 µm, 9.5 µm, 10 µm, 10.5 µm, 11 µm, 11.5 µm, 12 µm, 12.5 µm, 13 µm, 13.5 µm, 14 µm, 14.5 µm, 15 µm, 15.5 µm, 16 µm, or its value is within a range obtained by combining any two of the above values. In the present application, when the thicknesses of the separators of the first battery cell and the second battery cell are within the above-mentioned ranges, a relatively high volumetric energy density of the battery module can be ensured, and because the separators in the respective battery cells have relatively high mechanical strength and are less susceptible to foreign matters, uneven surfaces of electrode plates or interface side reaction products, the safety performance of the battery module is further improved.

In the present application, the thicknesses of the first separator and the second separator can be measured using methods known in the art. As an example, an X-ray areal density measuring instrument of DC PRECISION may be used to measure the thickness of a material without contact by means of the absorption and backscattering effect of X-rays penetrating the material. Optionally, the thickness of the separator can be tested using a contact probe method, with reference to the national standard GB/T 36363-2018.

The separator material of a lithium-ion battery has a microporous structure that allows an electrolyte to be absorbed for the transfer of free lithium ions between positive and negative electrodes. When the micropores are uniformly distributed across the entire surface of the separator material, consistent electrode/electrolyte interface properties and uniform current density in the battery can be ensured. The diameter and uniformity of the pores have a direct impact on battery performance: the pore diameter within a proper range can reduce the impedance of the battery, and can ensure that the positive and negative electrodes cannot be in direct contact or are not easily subjected to a short circuit caused by lithium dendrites puncturation.

In some embodiments of the present application, the average pore diameter r1 of the first separator and the average pore diameter r2 of the second separator satisfy: $0.01\ \mu m \leq r1 \leq 3\ \mu m$, and/or $0.01\ \mu m \leq r2 \leq 2\ \mu m$. Optionally, $0.03\ \mu m \leq r1 \leq 1.2\ \mu m$, and/or $0.03\ \mu m \leq r2 \leq 1\ \mu m$. Specifically, the average pore diameter r1 of the first separator may be 0.01 µm, 0.10 µm, 0.20 µm, 0.30 µm, 0.40 µm, 0.50 µm, 0.6 µm, 0.7 µm, 0.8 µm, 0.9 µm, 1.0 µm, 1.1 µm, 1.2 µm, 1.3 µm, 1.4 µm, 1.5 µm, 1.6 µm, 1.7 µm, 1.8 µm, 1.9 µm, 2.0 µm, 2.1 µm, 2.2 µm, 2.3 µm, 2.4 µm, 2.5 µm, 2.6 µm, 2.7 µm, 2.8 µm, 2.9 µm, 3.0 µm, or its value is within a range obtained by combining any two of the above values. The average pore diameter r2 of the second separator may be 0.01 µm, 0.10 µm, 0.20 µm, 0.30 µm, 0.40 µm, 0.50 µm, 0.6 µm, 0.7 µm, 0.8 µm, 0.9 µm, 1.0 µm, 1.1 µm, 1.2 µm, 1.3 µm, 1.4 µm, 1.5 µm, 1.6 µm, 1.7 µm, 1.8 µm, 1.9 µm, 2.0 µm, or its value is within a range obtained by combining any two of the above values.

In the present application, the pore diameter of the separator can be measured using methods known in the art. As an example, a TriStar II 3020 automatic adsorption meter can be used for the measurement. The specific test method may refer to the standards: GB/T 19587-2017 "Determination of the specific surface area of solids by gas adsorption using the BET method" and GB/T 21650.2-2008 "Pore diameter distribution and porosity of solid materials by mercury porosimetry and gas adsorption".

In some embodiments of the present application, the porosity ε1 of the first separator and the porosity ε2 of the second separator satisfy: $25\% \leq \varepsilon 1 \leq 60\%$, and/or $25\% \leq \varepsilon 2 \leq 60\%$. Optionally, $30\% \leq \varepsilon 1 \leq 50\%$, and/or $30\% \leq \varepsilon 2 \leq 50\%$. Specifically, the porosity ε1 of the first separator and the porosity ε2 of the second separator may independently be 25%, 25.5%, 26%, 26.5%, 27%, 27.5%, 28%, 28.5%, 29%, 29.5%, 30%, 30.5%, 31%, 31.5%, 32%, 32.5%, 33%, 33.5%, 34%, 34.5%, 35%, 35.5%, 36%, 36.5%, 37%, 37.5%, 38%, 38.5%, 39%, 39.5%, 40%, 40.5%, 41%, 41.5%, 42%, 42.5%, 43%, 43.5%, 44%, 44.5%, 45%, 45.5%, 46%, 46.5%, 47%, 47.5%, 48%, 48.5%, 49%, 49.5%, 50%, 50.5%, 51%, 51.5%, 52%, 52.5%, 53%, 53.5%, 54%, 54.5%, 55%, 55.5%, 56%, 56.6%, 57%, 57.5%, 58%, 58.5%, 59%, 59.5%, 60%, or their values are within a range obtained by combining any two of the above values. The porosity of the separator is very important for its permeability and electrolyte carrying capacity. It can be defined as: a ratio of the volume of pores to the volume of the separator, that is, a volume percentage of the pores per unit volume of the separator.

In the present application, the porosity of the separator can be measured using methods known in the art. As an example, an AccuPyc II 1340 true density tester can be used for the measurement. The specific test method is to test a total volume V1 and a real volume V2 of the separator respectively and the porosity of the separator is obtained according to a formula: porosity=(V1−V2)/V1×100%.

In some embodiments of the present application, the tortuosity Ti of the first separator and the tortuosity τ2 of the second separator satisfy: $1.1 \leq \tau1 \leq 3.9$, and/or $1.1 \leq \tau2 \leq 3.9$. Optionally, $1.3 \leq \tau1 \leq 3$, and/or $1.3 \leq \tau2 \leq 3$. Specifically, the tortuosity τ1 of the first separator and the tortuosity τ2 of the second separator may independently be 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, or their values are within a range obtained by combining any two of the above values. The tortuosity of the separator is an important parameter describing a tortuous degree of an internal pore channel of the separator. The tortuosity is defined as a ratio of an actual length of the pore channel to an apparent length (macro distance) passing through a seepage medium, that is, a true length of a trajectory of a seepage fluid mass point in the pore when the seepage fluid mass point passes through a medium per unit distance.

In the present application, the tortuosity of the separator can be measured by a test method known in the art. As an example, the tortuosity can be calculated by the following formula: tortuosity $\tau=\sqrt{N_m \times \varepsilon}$, where $N_m$ represents a McMullin number, and ε is the porosity of the separator. The McMullin number $N_m$ is a ratio of a resistivity of the separator immersed in an electrolyte to a resistivity of the electrolyte. The resistivity of the separator immersed in the electrolyte and the resistivity of the electrolyte can be measured by the following methods.

Test on the resistivity of the separator: an electrochemical workstation can be used, such as Shanghai Chenhua CHI600E, Solartron or Princeton. Rs of different separator layers (n) is measured by a confined symmetric battery EIS method according to the law of resistance $Rs=\rho \times l_0/(S \times n)$, plotting is carried out based on Rs and n to obtain a slope $k=(\rho \times l_0)/S$, and the resistivity $\rho=(k \times S)/l_0$ is determined under the condition that an effective area S and the thickness of the separator are known.

Test on the resistivity of the electrolyte: a resistance R of the electrolyte is tested using a conductivity meter (such as Thundermag DDSJ-318) under the condition of 25° C. and 1 kHz AC impedance, and the resistivity of the electrolyte is calculated according to the length l of the tested electrolyte, the cross-sectional area S, and the formula $\rho=R \times S/l$.

The inventors of the present application have discovered through dedicated researches that the pore diameter, porosity, and tortuosity of the separator will affect the kinetic performance, self-discharge rate and life of the battery cell. The larger pore diameter, higher porosity, and smaller tortuosity are more conducive to the transfer of the electrolyte. The higher the conductivity is, the higher the kinetic performance of the battery cell is, and the better the charge and discharge rate, low temperature performance and power performance are. However, if the pore diameter is too large, the porosity is too high, and the tortuosity is too small, relatively large self-discharge rate of the battery cell is easily caused, and even a short circuit may be directly caused in severe cases. In addition, if the separator has a smaller pore diameter, a lower porosity and a larger tortuosity, the self-discharge rate is lower, but the kinetic performance of the cell will degrade. Meanwhile, pores of a separator having a small pore diameter are easily blocked by the accumulation of interface side reaction products, which will increase the impedance of the battery cell, thereby shortening its service life.

Therefore, in the present application, by designing the pore diameter, porosity, and tortuosity of the separators of the first type of battery cells and the second type of battery cells as described above, the charge and discharge rate, low temperature performance and power performance of the battery cells and the battery module can be improved, the self-discharge rate of the battery cells and the battery module can be reduced, safety performance can be improved and service life can be prolonged.

In some embodiments of the present application, the contact angle θ1 between the first separator and the first electrolyte, and the contact angle θ2 between the second separator and the second electrolyte satisfy: $0.35 \leq \theta1 \leq 1.35$, and/or $0.35 \leq \theta2 \leq 1.35$, in radians. The inventors of the present application have discovered through dedicated researches that the contact angle between the separator and the electrolyte reflects the wettability of the electrolyte in the separator and the diffusion rate of the electrolyte in the separator; if the contact angle is smaller, the rate of transfer of the electrode from the surface of the separator in contact to the inside of the separator is faster, and the kinetic performance, charge and discharge rate, power performance and low temperature performance of the battery cell are better; and if the contact angle is larger, the rate of transfer of the electrode from the surface of the separator in contact to the inside of the separator is slower, and the kinetic performance, charge and discharge rate, power performance and low temperature performance of the battery cell are worse.

Therefore, in the present application, by designing the contact angles between the separators of the first type of battery cells and the second type of battery cells and the electrolytes as described above, the charge and discharge rate, low temperature performance and power performance of the battery cells and the battery module can be improved.

In the present application, the contact angle between the separator and the electrolyte reflects the wettability of the electrolyte in the separator and the diffusion rate of the electrolyte in the separator. The contact angle between the separator and the electrolyte can be measured by a test method known in the art. As an example, a method known in the art can be used to test the contact angle. An exemplary test method is as follows: a test sample is placed on a water contact angle tester (Kono Industries SL200 KB model), 10 μL of electrolyte is dropped at a position of 1 cm from the positive electrode film, and water droplets falling on the surface of the sample are shot by an optical microscope and a high-speed camera. The test was performed under the conditions of 25° C. and atmospheric pressure (0.1 MPa). The angle between the tangent line of the contact surface of the water droplet and the sample and the horizontal plane is measured by software analysis, and the angle is the contact angle, in radians.

In some embodiments of the present application, in the first battery cell, the first separator includes a first substrate and a first coating disposed on at least one surface of the first substrate; and in the second battery cell, the second separator includes a second substrate and a second coating disposed on at least one surface of the second substrate. The first substrate and the second substrate are of porous structures. The first substrate and the second substrate may independently be a polymer film formed by one or more polymers selected from the following: polyolefins (such as polyethylene and polypropylene), polyesters (such as polyethylene terephthalate and polybutylene terephthalate), polyacetal, polyamide, polyimide, polycarbonate, polyetheretherketone, polyaryletherketone, polyetherimide, polyamideimide, polybenzimidazole, polyethersulfone, polyphenylene ether, cycloolefin copolymer, polyphenylene sulfide, polyethylene naphthalate, glass fibers, Teflon and polytetrafluoroethylene, or a copolymer or mixture of two or more thereof, but are not limited thereto.

In some embodiments of the present application, optionally, the first substrate and the second substrate may be polyolefin-based substrates. Since the polyolefin-based substrate has an improved shutdown function, it helps improve battery safety. Further optionally, the polyolefin-based substrate may be at least one selected from a polyethylene single-layer film, a polypropylene single-layer film, a polyethylene/polypropylene double-layer film, a polypropylene/polyethylene/polypropylene three-layer film, and a polyethylene/polypropylene/polyethylene three-layer film. In addition to the olefin resin, the first substrate and the second substrate may also include a non-olefin resin, or may include a copolymer of an olefin and a non-olefin monomer.

In some embodiments of the present application, the first substrate has a thickness of 3 μm to 15 μm; and/or the second substrate has a thickness of 4 μm to 13 μm. In the present application, when the thicknesses of the first substrate and the second substrate are within the above ranges, short circuits of the positive and negative electrode plates can be effectively avoided, and relatively high volumetric energy densities of the first battery cell and the second battery cell can be ensured, thereby improving the safety performance and volumetric energy density of the battery module.

In some embodiments of the present application, the first coating contains inorganic particles, and the inorganic particles are one or more selected from boehmite ($\gamma$-AlOOH), aluminum oxide ($Al_2O_3$), barium sulfate ($BaSO_4$), magnesium oxide (MgO), magnesium hydroxide ($Mg(OH)_2$), silicon dioxide ($SiO_2$), tin dioxide ($SnO_2$), titanium oxide ($TiO_2$), calcium oxide (CaO), zinc oxide (ZnO), zirconium oxide ($ZrO_2$), yttrium oxide ($Y_2O_3$), nickel oxide (NiO), cerium oxide ($CeO_2$), zirconium titanate ($SrTiO_3$), barium titanate ($BaTiO_3$), and magnesium fluoride ($MgF_2$). In the present application, when the first coating on the surface of the separator of the first battery cell contains the above-mentioned inorganic particles, the thermal stability of the separator of the first battery cell can be improved, the thermal shrinkage of the separator can be reduced at a relatively high temperature, the internal short circuit caused by the shrinkage of the separator can be effectively avoided, and the use safety of the first battery cell can be greatly improved. Meanwhile, because the coated separator has better electrolyte wettability and better oxidation resistance, the kinetics and service life of the battery cell can be improved. Moreover, when the first coating contains the above-mentioned inorganic particles, the resistivity of the coating is relatively high, and the self-discharge of the first battery cell can also be improved.

In some embodiments of the present application, based on a weight of the first coating, the inorganic particles have a weight percentage of 50% to 99%, and optionally 70% to 90%. In the present application, when the content of the inorganic particles in the first coating on the surface of the separator of the first battery cell is within the above range, the uniformity and compactness of the coating can be ensured and the characteristics of better pore diameter, porosity and tortuosity can be satisfied on the premise that the thermal stability and high resistivity of the separator of the first battery cell are ensured.

In some embodiments of the present application, the second coating contains organic particles, and the organic particles are one or more selected from polytetrafluoroethylene, polyvinylidene fluoride, polychlorotrifluoroethylene, polyvinylidene fluoride, modified polyvinylidene fluoride, vinylidene fluoride-hexafluoropropylene copolymer, polyethylene, polypropylene, polyacrylonitrile, polyethylene oxide, acrylate, polymethyl methacrylate, polyacrylonitrile, ethyl cellulose, copolymers of different fluorine-containing alkenyl monomer units, copolymers of fluorine-containing alkenyl monomer units and olefin-based monomer units, copolymers of fluorine-containing alkenyl monomer units and acrylic monomer units, copolymers of fluorine-containing alkenyl monomer units and acrylate monomer units, and modified compounds of homopolymers or copolymers thereof. In the present application, the surface of the separator of the second battery cell is a coating containing organic particles, which can increase the bonding between the electrode plates. The stronger bonding can increase the hardness of the bare battery cell, prevent dislocation or deformation, help improve the flatness and consistency of the interface of the second battery cell during manufacturing and use, and prevent the electrode plate from wrinkling or lithium precipitation.

In some embodiments of the present application, the second coating may further contain inorganic particles, and the inorganic particles are one or more selected from boehmite ($\gamma$-AlOOH), aluminum oxide ($Al_2O_3$), barium sulfate ($BaSO_4$), magnesium oxide (MgO), magnesium hydroxide ($Mg(OH)_2$), silicon dioxide ($SiO_2$), tin dioxide ($SnO_2$), titanium oxide ($TiO_2$), calcium oxide (CaO), zinc oxide (ZnO), zirconium oxide ($ZrO_2$), yttrium oxide ($Y_2O_3$), nickel oxide (NiO), cerium oxide ($CeO_2$), zirconium titanate ($SrTiO_3$), barium titanate ($BaTiO_3$), and magnesium fluoride ($MgF_2$).

In some embodiments of the present application, based on a weight of the second coating, the organic particles have a weight percentage of 30% to 99%, and optionally 50% to 90%. In the present application, when the content of the organic particles in the second coating on the surface of the separator of the second battery cell is within the above range, an effective bonding effect can be ensured without adding excessive weight and/or volume or affecting the energy density of the battery cell.

In some embodiments of the present application, the first coating on one side has a thickness of 0.05 μm to 2 μm; and/or the second coating on one side has a thickness of 0.25 μm to 3.5 μm. In the present application, when the thickness of the coating on one side of the surface of the separator in the first battery cell and the second battery cell is within the above range, the volumetric energy density of the first battery cell with relatively high chemical stability can be increased, and the safety performance of the second battery cell with relatively high volumetric energy density can be improved, thereby increasing the overall volumetric energy density and safety of the module.

In some embodiments of the present application, in the first battery cell, the first coating is disposed on both upper and lower surfaces of the first substrate.

In some embodiments of the present application, in the second battery cell, the second coating is disposed on both upper and lower surfaces of the second substrate.

In some embodiments of the present application, a positive electrode active material for the first battery cell includes at least one of a lithium-containing phosphate represented by formula (I) or a lithium manganese-based oxide represented by formula (II), $$LiFe_{1-x2-y2}Mn_{x2}M'_{y2}PO_4 \quad \text{formula (I)}$$

$$Li_{1+x3}Mn_eN_{2-e}O_{4-d}B_d \quad \text{formula (II)}$$

wherein in formula (I), $0 \le x2 \le 1$, $0 \le y2 \le 0.1$, and M' is one or more selected from transition metal elements and non-transition metal elements other than Fe and Mn; and in formula (II), $-0.1 \le x3 \le 0.2$, $0 < e \le 2$, $0 \le d < 1$, N is one or more of Ni, Fe, Cr, Ti, Zn, V, Al, Mg, Zr and Ce, and B is one or more of S, N, F, Cl, Br and I.

In some embodiments of the present application, the positive electrode active material for the first battery cell includes one or more of $LiFePO_4$, $LiMnPO_4$, $LiMn_{1-x3}Fe_{x3}PO_4$, $LiV_{1-x3}Fe_{x3}PO_4$, $LiMn_2O_4$, and $LiMn_{1.9}Al_{0.1}O_4$, where x3 independently satisfies $0 \le x3 < 1$. In the present application, the lithium-containing phosphate has better cycle stability and a longer cycle life, so the first battery cell using this type of positive electrode active material has a longer cycle life, which is beneficial to prolonging the cycle life of the battery module. In the middle and late stages of the cycle life of the battery module, the power output characteristics of the battery module can be further improved by means of the technical advantage of slow power attenuation of this type of first battery cell. The lithium manganate material with a spinel structure has better crystal structure stability, so the first battery cell using this type of positive electrode active material has good rate performance, which is beneficial to further improving the rate performance of the battery module.

In some embodiments of the present application, a positive electrode active material for the second battery cell includes a lithium transition metal oxide represented by formula (III), $$Li_{1-x1}Ni_aCO_bM_{1-a-b}O_{2-y1}A_{y1} \quad \text{formula (III)}$$

where $-0.1 \le x1 \le 0.2$, $0.5 \le a < 0.95$, $0 < b < 0.2$, $0 \le a+b < 1$, $0 \le y1 < 0.2$, M is one or more selected from Mn, Fe, Cr, Ti, Zn, V, Al, Zr and Ce, and A is one or more selected from S, F, Cl and I. In the present application, when the second battery cell uses the above-mentioned positive electrode active material with a relatively high gram capacity, the volumetric energy density of the second battery cell can be further increased, so that the volumetric energy density of the battery module is also significantly increased.

[Battery Pack]

In some embodiments of the present application, two or more of the above-mentioned battery modules can be assembled into a battery pack, and the number of battery modules included in the battery pack depends on the application of the battery pack and the parameters of a single battery module. The battery pack may include a battery box and a plurality of battery modules disposed in the battery box, the battery box includes an upper box body and a lower box body, and the upper box body can cover the lower box body and match the lower box body well to form a closed space for receiving the battery modules. Two or more battery modules can be arranged in the battery box in a desired manner. In the present application, the "battery pack" is made by further assembling one or more battery modules (or a combination directly formed by a plurality of battery cells) into various control and protection systems such as a battery management system and a thermal management system.

Figure 4:
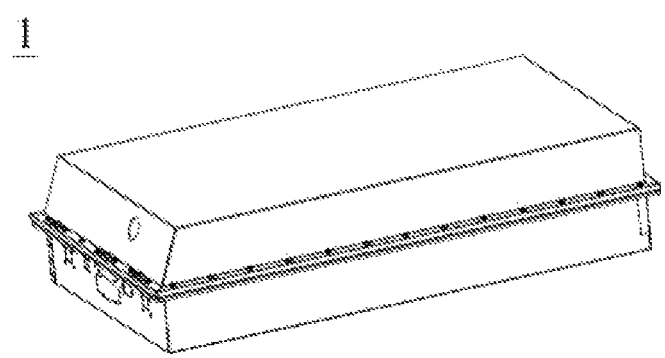
FIG. 4 is a schematic diagram showing an example of a battery pack of the present application.
Figure 5:
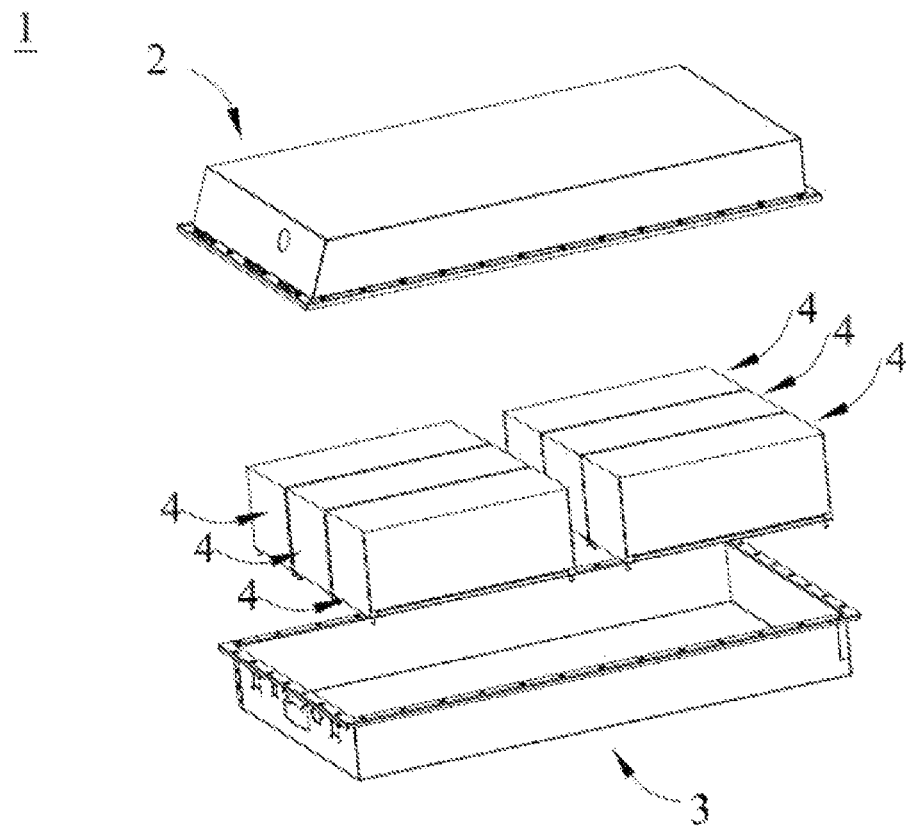
FIG. 5 is an exploded view showing an example of the battery pack of the present application shown in FIG. 4.

FIG. 4 is a schematic diagram showing an example of a battery pack 1 of the present application. FIG. 5 is an exploded view showing an example of the battery pack 1 of the present application shown in FIG. 4. Referring to FIGS. 4 and 5, the battery pack 1 may include a battery box and a plurality of battery modules 4 disposed in the battery box. The battery box includes an upper box body 2 and a lower box body 3. The upper box body 2 is used to cover the lower box body 3 and form a closed space for receiving the battery modules 4. The plurality of battery modules 4 may be arranged in the battery box in any manner.

[Electric Apparatus]

In some embodiments of the present application, the electric apparatus of the present application includes at least one of the battery module or battery pack of the present application, and the battery module or battery pack may be used as a power source of the electric apparatus, and may also be used as an energy storage unit of the electric apparatus. The electric apparatus includes, but is not limited to, a mobile digital apparatus (e.g., a mobile phone, a notebook computer, etc.), an electric vehicle (e.g., a pure electric vehicle, a hybrid electric vehicle, a plug-in hybrid electric vehicle, an electric bicycle, an electric scooter, an electric golf vehicle, an electric truck, etc.), an electric train, a ship, a satellite, an energy storage system, etc.

Figure 6:
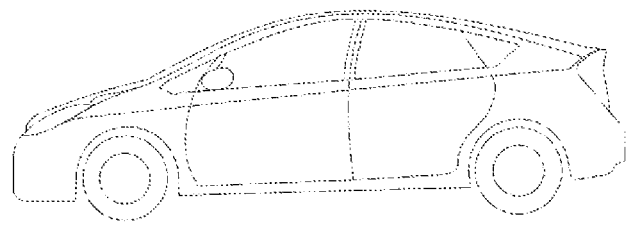
FIG. 6 is a schematic diagram showing an example of an electric apparatus using the battery module of the present application as a power source.

FIG. 6 is a schematic diagram showing an example of the electric apparatus using the battery module of the present application as a power source. The electric apparatus is a pure electric vehicle, a hybrid electric vehicle, or a plug-in hybrid electric vehicle. In order to meet the requirements of the electric apparatus for high power and high energy density, battery packs or battery modules may be used.

[Method for Manufacturing a Battery Module]

The present application proposes a method for manufacturing a battery module, including the following steps:

obtaining a first type of battery cells and a second type of battery cells, wherein
the first type of battery cells and the second type of battery cells are battery cells with different chemical systems,
the first type of battery cells includes N first battery cells,
the second type of battery cells includes M second battery cells, N and M are positive integers,
the first battery cell includes a first separator and a first electrolyte,
the second battery cell includes a second separator and a second electrolyte,
a kinetic characteristic factor x1 of the first battery cell is: $x1 = 1000 \times (\epsilon1 \times r1)/(\tau1 \times t1 \times \theta1)$,
a kinetic characteristic factor x2 of the second battery cell is: $x2 = 1000 \times (\epsilon2 \times r2)/(\tau \times t2 \times \theta2)$,
and x1 and x2 satisfy: $0.01 \le x1/x2 \le 160$, where
$\epsilon1$ and $\epsilon2$ are respectively a porosity of the first separator and a porosity of the second separator, in %, r1 and r2 are respectively an average pore diameter of the first separator and an average pore diameter of the second separator, in μm, τ1 and τ2 are respectively a tortuosity of the first separator and a tortuosity of the second separator, t1 and t2 are respectively an average thickness of the first separator and an average thickness of the second separator, in μm, θ1 is a contact angle between the first separator and the first electrolyte, in radians, and θ2 is a contact angle between the second separator and the second electrolyte, in radians; and electrically connecting the first type of battery cells and the second type of battery cells at least in series to form the battery module described in the first aspect of the present application.

[Device for Manufacturing a Battery Module]

The present application proposes a device for manufacturing a battery module, including:

a clamping arm unit, configured to obtain a first type of battery cells and a second type of battery cells, the first type of battery cells and the second type of battery cells are battery cells with different chemical systems, the first type of battery cells includes N first battery cells, the second type of battery cells includes M second battery cells, N and M are positive integers, the first battery cell includes a first separator and a first electrolyte, the second battery cell includes a second separator and a second electrolyte, a kinetic characteristic factor x1 of the first battery cell is: $x1=1000\times(\varepsilon1\times r1)/(\tau1\times t1\times\theta1)$, a kinetic characteristic factor x2 of the second battery cell is: $x2=1000\times(\varepsilon2\times r2)/(\tau2\times t2\times\theta2)$, and x1 and x2 satisfy: $0.01\leq x1/x2\leq160$, where ε1 and ε2 are respectively a porosity of the first separator and a porosity of the second separator, in %, r1 and r2 are respectively an average pore diameter of the first separator and an average pore diameter of the second separator, in μm, τ1 and τ2 are respectively a tortuosity of the first separator and a tortuosity of the second separator, t1 and t2 are respectively an average thickness of the first separator and an average thickness of the second separator, in μm, θ1 is a contact angle between the first separator and the first electrolyte, in radians, and θ2 is a contact angle between the second separator and the second electrolyte, in radians;

an assembling unit, configured to electrically connect the first type of battery cells and the second type of battery cells at least in series to form the battery module described in the first aspect of the present application; and a control unit, configured to control the clamping arm unit and the assembling unit.

Some exemplary embodiments of the present invention are provided as follows.

Embodiment 1. A battery module, comprising a first type of battery cells and a second type of battery cells electrically connected at least in series, the first type of battery cells and the second type of battery cells being battery cells with different chemical systems, wherein the first type of battery cells comprises N first battery cells, the second type of battery cells comprises M second battery cells, N and M are positive integers, the first battery cell comprises a first separator and a first electrolyte, the second battery cell comprises a second separator and a second electrolyte, a kinetic characteristic factor x1 of the first battery cell is: $x1=1000\times(\varepsilon1\times r1)/(\tau1\times t1\times\theta1)$, a kinetic characteristic factor x2 of the second battery cell is: $x2=1000\times(\varepsilon2\times r2)/(\tau2\times t2\times\theta2)$, and x1 and x2 satisfy: $0.01\leq x1/x2\leq160$, where ε1 and ε2 are respectively a porosity of the first separator and a porosity of the second separator, in %;

r1 and r2 are respectively an average pore diameter of the first separator and an average pore diameter of the second separator, in μm;

τ1 and τ2 are respectively a tortuosity of the first separator and a tortuosity of the second separator;

t1 and t2 are respectively an average thickness of the first separator and an average thickness of the second separator, in μm;

θ1 is a contact angle between the first separator and the first electrolyte, in radians; and θ2 is a contact angle between the second separator and the second electrolyte, in radians.

Embodiment 2. The battery module according to Embodiment 1, wherein the first battery cell and the second battery cell satisfy: $0.1\leq x1/x2\leq100$; optionally, $0.3\leq x1/x2\leq60$; and further optionally, $0.5\leq x1/x2\leq15$.

Embodiment 3. The battery module according to Embodiment 1 or 2, wherein the first battery cell and the second battery cell satisfy: $0.3\leq x1\leq95$, and/or $0.2\leq x2\leq55$;

optionally, $0.5\leq x1\leq40$, and/or $0.5\leq x2\leq35$; and further optionally, $1\leq x1\leq20$, and/or $1\leq x2\leq20$.

Embodiment 4. The battery module according to any one of Embodiments 1-3, wherein the average thickness t1 of the first separator and the average thickness t2 of the second separator satisfy: 4 μm≤t1≤20 μm, and/or 8 μm≤t2≤16 μm; and optionally, 7 μm≤t1≤10 μm, and/or 11 μm≤t2≤14 μm.

Embodiment 5. The battery module according to any one of Embodiments 1-4, wherein the average pore diameter r1 of the first separator and the average pore diameter r2 of the second separator satisfy: 0.01 μm≤r1≤3 μm, and/or 0.01 μm≤r2≤2 μm; and optionally, 0.03 μm r1≤1.2 μm, and/or 0.03 μm≤r2≤1 μm.

Embodiment 6. The battery module according to any one of Embodiments 1-5, wherein the porosity ε1 of the first separator and the porosity ε2 of the second separator satisfy: 25%≤ε1≤60%, and/or 25%≤ε2≤60%; and optionally, 30%≤ε1≤50%, and/or 30%≤ε2≤50%.

Embodiment 7. The battery module according to any one of Embodiments 1-6, wherein the tortuosity τ1 of the first separator and the tortuosity t2 of the second separator satisfy: $1.1\leq\tau1\leq3.9$, and/or $1.1\leq\tau2<3.9$; and optionally, $1.3\leq\tau1\leq3$, and/or $1.3\leq\tau2\leq3$.

Embodiment 8. The battery module according to any one of Embodiments 1-7, wherein the contact angle θ1 between the first separator and the first electrolyte, and the contact angle θ2 between the second separator and the second electrolyte satisfy: $0.35\leq\theta1\leq1.35$, and/or $0.35\leq\theta2\leq1.35$, in radians.

Embodiment 9. The battery module according to any one of Embodiments 1-8, wherein in the first battery cell, the first separator comprises a first substrate and a first coating disposed on at least one surface of the first substrate; in the second battery cell, the second separator comprises a second substrate and a second coating disposed on at least one surface of the second substrate, and at least one of the following conditions is satisfied:

(1) the first substrate has a thickness of 3 μm to 19.5 μm; and/or the second substrate has a thickness of 4 μm to 15 μm;

(2) the first coating on one side has a thickness of 0.05 μm to 2 μm; and/or the second coating on one side has a thickness of 0.25 μm to 3.5 μm;

(3) the first coating contains inorganic particles, and the inorganic particles are one or more selected from boehmite (γ-AlOOH), aluminum oxide ($Al_2O_3$), barium sulfate ($BaSO_4$), magnesium oxide (MgO), magnesium hydroxide ($Mg(OH)_2$), silicon dioxide ($SiO_2$), tin dioxide ($SnO_2$), titanium oxide ($TiO_2$), calcium oxide (CaO), zinc oxide (ZnO), zirconium oxide ($ZrO_2$), yttrium oxide ($Y_2O_3$), nickel oxide (NiO), cerium oxide ($CeO_2$), zirconium titanate ($SrTiO_3$), barium titanate ($BaTiO_3$), and magnesium fluoride ($MgF_2$); and optionally, based on a weight of the first coating, the inorganic particles have a weight percentage of 50% to 99%, and optionally 70% to 90%; and (4) the second coating contains organic particles, and the organic particles are one or more selected from polytetrafluoroethylene, polyvinylidene fluoride, polychlorotrifluoroethylene, polyvinylidene fluoride, modified polyvinylidene fluoride, vinylidene fluoride-hexafluoropropylene copolymer, polyethylene, polypropylene, polyacrylonitrile, polyethylene oxide, acrylate, polymethyl methacrylate, polyacrylonitrile, ethyl cellulose, copolymers of different fluorine-containing alkenyl monomer units, copolymers of fluorine-containing alkenyl monomer units and olefin-based monomer units, copolymers of fluorine-containing alkenyl monomer units and acrylic monomer units, copolymers of fluorine-containing alkenyl monomer units and acrylate monomer units, and modified compounds of the above homopolymers or copolymers; and optionally, based on a weight of the second coating the organic particles have a weight percentage of 30% to 99%, and optionally 50% to 90%.

Embodiment 10. The battery module according to any one of Embodiments 1-9, wherein a positive electrode active material for the first battery cell comprises at least one of a lithium-containing phosphate represented by formula (I) or a lithium manganese-based oxide represented by formula (II),

formula (I)

formula (II)

wherein in formula (I), 0≤x2≤1, 0≤y2≤0.1, and M' is one or more selected from transition metal elements and non-transition metal elements other than Fe and Mn; in formula (II), −0.1≤x3≤0.2, 0≤e≤2, 0≤d<1, N is one or more of Ni, Fe, Cr, Ti, Zn, V, Al, Mg, Zr and Ce, and B is one or more of S, N, F, Cl, Br and I;

optionally, the positive electrode active material for the first battery cell comprises one or more of $LiFePO_4$, $LiMnPO_4$, $LiMn_{1-x3}Fe_{x3}PO_4$, $LiV_{1-x3}Fe_xPO_4$, $LiMn_2O_4$, and $LiMn_{1.9}Al_{0.1}O_4$, where x3 independently satisfies 0≤x3<1; and optionally, based on 100% weight of the positive electrode active material for the first battery cell, at least one of the lithium-containing phosphate represented by formula (I) or the lithium manganese-based oxide represented by formula (II) has a weight percentage of not less than 70%.

Embodiment 11. The battery module according to any one of Embodiments 1-10, wherein a positive electrode active material for the second battery cell comprises a lithium transition metal oxide represented by formula (III),

formula (III)

where −0.1≤x1≤0.2, 0.3≤a<0.95, 0≤b<0.2, 0≤a+b<1, 0≤y1<0.2, M is one or more selected from Mn, Fe, Cr, Ti, Zn, V, Al, Zr and Ce, and A is one or more selected from S, F, Cl and I; and optionally, 0.5≤a<0.95, and 0<b<0.15; and optionally, based on 100% weight of the positive electrode active material for the second battery cell, the lithium transition metal oxide represented by formula (III) has a weight percentage of not less than 70%.

Embodiment 12. A battery pack, comprising the battery module according to any one of Embodiments 1-11.

Embodiment 13. An electric apparatus, comprising the battery module according to any one of Embodiments 1-11 or the battery pack according to Embodiment 12, wherein the battery module or the battery pack can be used as a power source or an energy storage unit of the electric apparatus.

Embodiment 14. A method for manufacturing a battery module, comprising the following steps:

obtaining a first type of battery cells and a second type of battery cells, wherein the first type of battery cells and the second type of battery cells are battery cells with different chemical systems, the first type of battery cells comprises N first battery cells, the second type of battery cells comprises M second battery cells, N and M are positive integers, the first battery cell comprises a first separator and a first electrolyte, the second battery cell comprises a second separator and a second electrolyte, a kinetic characteristic factor x1 of the first battery cell is: x1=1000×(ε1×r1)/(τ1×t1×θ1), a kinetic characteristic factor x2 of the second battery cell is: x2=1000×(ε2×r2)/(τ2×t2×θ2), and x1 and x2 satisfy: 0.01≤x1/x2≤160, where ε1 and ε2 are respectively a porosity of the first separator and a porosity of the second separator, in %;

r1 and r2 are respectively an average pore diameter of the first separator and an average pore diameter of the second separator, in μm;

τ1 and τ2 are respectively a tortuosity of the first separator and a tortuosity of the second separator;

t1 and t2 are respectively an average thickness of the first separator and an average thickness of the second separator, in μm;

θ1 is a contact angle between the first separator and the first electrolyte, in radians;

θ2 is a contact angle between the second separator and the second electrolyte, in radians; and electrically connecting the first type of battery cells and the second type of battery cells in series to form the battery module according to any one of Embodiments 1 to 11.

Embodiment 15. A device for manufacturing a battery module, comprising:

a clamping arm unit, configured to obtain a first type of battery cells and a second type of battery cells, the first type of battery cells and the second type of battery cells are battery cells with different chemical systems, wherein the first type of battery cells comprises N first battery cells, the second type of battery cells comprises M second battery cells, N and M are positive integers, the first battery cell comprises a first separator and a first electrolyte, the second battery cell comprises a second separator and a second electrolyte, a kinetic characteristic factor x1 of the first battery cell is: x1=1000×(ε1×r1)/(τ1×t1×θ1), a kinetic characteristic factor x2 of the second battery cell is: x2=1000×(ε2×r2)/(12×t2×θ2), and x1 and x2 satisfy: 0.01≤x1/x2≤160, where
- ε1 and ε2 are respectively a porosity of the first separator and a porosity of the second separator, in %;
- r1 and r2 are respectively an average pore diameter of the first separator and an average pore diameter of the second separator, in μm;
- τ1 and τ2 are respectively a tortuosity of the first separator and a tortuosity of the second separator;
- t1 and t2 are respectively an average thickness of the first separator and an average thickness of the second separator, in μm;
- θ1 is a contact angle between the first separator and the first electrolyte, in radians;
- θ2 is a contact angle between the second separator and the second electrolyte, in radians;

an assembling unit, configured to electrically connect the first type of battery cells and the second type of battery cells in series to form the battery module according to any one of Embodiments 1 to 11; and a control unit, configured to control the clamping arm unit and the assembling unit.

Examples

Hereinafter, the technical solutions of the present application and the advantages thereof are described in detail through specific examples.

Preparation of Battery Cells

Referring to GB/T 31484-2015 "Requirements and Test Methods for Cycle Life of Power Storage Batteries for Electric Vehicles", the preparation methods of battery cells in examples and comparative examples are as follows.

1. Preparation of a Positive Electrode Slurry

A positive electrode active material, conductive carbon Super P, and polyvinylidene fluoride (PVDF) as a binder were fully stirred and mixed at a weight ratio of 95:3:2 in an appropriate amount of N-methylpyrrolidone (abbreviated as NMP) as solvent to form a uniform and stable slurry with a viscosity of 10000 mPa·s. The slurry generated no gelling, stratification or sedimentation and the like within 24 hours of standing (the positive electrode active materials for the first battery cell and the second battery cell were respectively shown in Table 1 and Table 2).

2. Preparation of a Positive Electrode Plate

The positive electrode material slurry was uniformly applied on a positive electrode current collector Al foil; and after drying, the electrode plate was cold-pressed to a designed compaction density; and a positive electrode plate was obtained by slitting the electrode plate for later use.

3. Preparation of an Electrolyte

An equal volume of ethylene carbonate was dissolved in propylene carbonate, and then lithium hexafluorophosphate was uniformly dissolved in the mixed solvent for later use (the lithium hexafluorophosphate had a concentration of 1.1 M/L) to obtain an electrolyte.

4. Preparation of a Negative Electrode Plate

Negative electrode active materials such as graphite, conductive carbon, polystyrene-butadiene copolymer (SBR) as a binder, sodium carboxymethylcellulose (CMC) as a thickener were fully stirred and mixed at a weight ratio of 95:2:2:1 in an appropriate amount of water as a solvent to form a uniform and stable negative electrode slurry; the slurry was evenly applied on a negative electrode current collector Cu foil, and after drying, the electrode plate was cold-pressed to a designed compactness density, and was slit for later use.

5. Separator

In Example 1 (Ex. 1), the separator of the first battery cell included a PE substrate having a thickness of 7 μm, and a first coating having a thickness of 1 m on one side and containing 70 wt % of AlOOH inorganic particles. A specific preparation method was as follows: inorganic particles γ-AlOOH, a binder acrylate emulsion, and sodium carboxymethyl cellulose were dispersed at a mass ratio of 70 wt %:25%:5% in deionized water of an equal mass, and uniformly mixed to form a first coating slurry; and the first coating slurry was uniformly applied on surfaces of two sides of the substrate; after drying, a separator of the first battery cell was obtained, which included a first coating having a thickness of 1 μm.

In Example 1, the separator of the second type of battery cell included a PE substrate having a thickness of 4 μm, and an inorganic-organic composite coating having a thickness of 0.25 μm on one side (including 80 wt % of AlOOH inorganic particle coating having a thickness of 0.15 μm and 30 wt % of PVDF organic particle coating having a thickness of 0.10 μm, which were sequentially disposed on the surface of the substrate). A specific preparation method was:

1) inorganic particles γ-AlOOH, acrylate emulsion as a binder, and sodium carboxymethyl cellulose were dispersed at a mass ratio of 80 wt %:15%:5% in deionized water of an equal mass, and uniformly mixed to form a γ-AlOOH inorganic particle sub-coating slurry;
2) PVDF organic particles and styrene polybutadiene rubber as a binder were dispersed at a mass ratio of 30 wt %:70 wt % in twice mass of deionized water, and uniformly mixed to form a PVDF organic particle sub-coating slurry;
3) The γ-AlOOH inorganic particle sub-coating slurry was uniformly applied on surfaces of two sides of the substrate and dried;
4) The PVDF organic particle coating was partially applied on the surface of the AlOOH inorganic particle coating by spraying, and dried, and finally the separator of the second battery cell was obtained.

Multiple parameters of the separator of the first battery cell and the separator of the second battery cell were shown in Table 1 and Table 2.

Various parameters of separators in other examples were shown in Table 1 below.

6. Preparation of a Battery Cell

The above-mentioned positive electrode plate, separator and negative electrode plate were wound together by using the conventional battery cell manufacturing process to form a bare battery cell. Then the bare battery cell was placed in a battery shell. The above-mentioned electrolyte was injected. After the procedures of formation and sealing a rechargeable power battery cell was obtained at last.

Hereinafter, methods for testing a separator and a battery cell will be described.

Method for Testing the Thickness of a Separator

As a method for measuring the thickness of a separator, an X-ray areal density measuring instrument of DC PRECISION may be used. That was, the thickness and areal density of a material were measured without contact by means of the absorption and backscattering effect of X-rays penetrating the material.

Method for Testing a Pore Diameter of the Separator

A TriStar II 3020 automatic adsorption meter was used for measurement. The specific test method may refer to the standards: GB/T 19587-2017 "Determination of the specific surface area of solids by gas adsorption using the BET method" and GB/T 21650.2-2008 "Pore diameter distribution and porosity of solid materials by mercury porosimetry and gas adsorption".

Method for Testing a Porosity of the Separator

An AccuPyc II 1340 true density tester was used for measurement. The specific test method was to test a total volume V1 and a real volume V2 of the separator respectively and a porosity of the separator was obtained according to a formula: porosity=(V1−V2)/V1×100%.

Method for Testing a Tortuosity of the Separator

The tortuosity can be calculated by the following formula: tortuosity $\tau=\sqrt{N_m \times \varepsilon}$, where $N_m$ represented a McMullin number, and a was the porosity of the separator. The McMullin number $N_m$ was a ratio of a resistivity of the separator immersed in the electrolyte to a resistivity of the electrolyte. The resistivity of the separator immersed in the electrolyte and the resistivity of the electrolyte can be measured by the following methods.

Test on the resistivity of the separator: an electrochemical workstation can be used, such as Shanghai Chenhua CHI600E, Solartron or Princeton. Rs of different separator layers (n) was measured by a confined symmetric battery EIS method according to the law of resistance $Rs=\rho \times l_0/(S \times n)$, plotting was carried out based on Rs and n to obtain a slope $k=(\rho \times l_0)/S$, and the resistivity $\rho=(k \times S)/l_0$ was solved under the condition that an effective area S and the thickness of the separator were known.

Test on the resistivity of the electrolyte: a resistance R of the electrolyte was tested using a conductivity meter (such as Thundermag DDSJ-318) under the condition of 25° C. and 1 kHz AC impedance, and the resistivity of the electrolyte was calculated according to the length/of the tested electrolyte, the cross-sectional area S, and the formula $\rho=R \times S/l$.

Method for Testing a Contact Angle Between the Separator and the Electrolyte

A test sample was placed on a water contact angle tester (Kono Industries SL200 KB model), 10 μL of electrolyte was dropped at a position of 1 cm from the positive electrode film, and water droplets falling on the surface of the sample were shot by an optical microscope and a high-speed camera. The test was performed under the conditions of 25° C. and atmospheric pressure (0.1 MPa). The angle between the tangent line of the contact surface of the water droplet and the sample and the horizontal plane was measured by software analysis, and the angle was the contact angle, in radians.

Through the above method of Preparation of battery cells, battery modules of Examples 1-14 (Ex. 1-14) below can be obtained.

In addition, through the above test methods, Table 1 (batteries 1-1 to 1-14) showing the thickness, pore diameter, porosity, tortuosity, contact angle, kinetic characteristic factor, and self-discharge rate of the separator of the first type of battery cells can be obtained, and Table 2 (batteries 2-1 to 2-14) showing the thickness, pore diameter, porosity, tortuosity, contact angle, kinetic characteristic factor, and self-discharge rate of the separator of the second type of battery cells can be obtained.

TABLE 1

| First battery cell No. | Positive electrode active material | First substrate material | Thickness of first substrate (μm) | Thickness of first coating (μm) | Composition and mass ratio of first coating | Thickness t1 of separator (μm) | Pore diameter r1 (μm) | Porosity ε1 | Tortuosity τ1 | Contact angle θ1 (radians) | Kinetic characteristic factor x1 |
|---|---|---|---|---|---|---|---|---|---|---|---|
| 1-1 | $LiFePO_4$ | PE | 7 | 1 | AlOOH 70 wt % | 9 | 0.01 | 55% | 1.3 | 1.09 | 0.43 |
| 1-2 | $LiFePO_4$ | PE | 3 | 0.5 | AlOOH 50 wt % | 4 | 0.05 | 60% | 1.1 | 1.35 | 5.05 |
| 1-3 | $LiFePO_4$ | PE | 7 | 2 | AlOOH 80 wt % | 11 | 0.13 | 40% | 2.2 | 0.67 | 3.21 |
| 1-4 | $LiFePO_4$ | PE | 7 | 1 | AlOOH 90 wt % | 9 | 0.3 | 30% | 3 | 0.39 | 8.55 |
| 1-5 | $LiFePO_4$ | PE | 7 | 1 | AlOOH 99 wt % | 9 | 0.5 | 25% | 3.9 | 0.35 | 10.18 |
| 1-6 | $LiFePO_4$ | PE | 7 | 1 | AlOOH 85 wt % | 9 | 0.13 | 40% | 2.2 | 0.67 | 3.92 |
| 1-7 | $LiFePO_4$ | PE | 7 | 1 | AlOOH 80 wt % | 9 | 3 | 40% | 2.2 | 0.67 | 90.46 |
| 1-8 | $LiFePO_4$ | PE | 19.5 | 0.25 | AlOOH: PVDF 85 wt %: 85 wt % | 20 | 1.2 | 45% | 1.8 | 0.61 | 24.59 |
| 1-9 | $LiFe_{0.98}Ti_{0.02}PO_4$ | PE | 7 | 1 | AlOOH: PVDF 85 wt %: 80 wt % | 9 | 0.13 | 40% | 2.2 | 0.67 | 3.92 |
| 1-10 | $LiMn_{0.7}Fe_{0.3}PO_4$ | PE | 7 | 1 | AlOOH: PVDF 85 wt %: 75 wt % | 9 | 0.13 | 40% | 2.2 | 0.67 | 3.92 |
| 1-11 | $LiMn_2O_4$ | PE | 7 | 1.5 | AlOOH: PVDF 85 wt %: 70 wt % | 10 | 0.13 | 40% | 2.1 | 0.62 | 3.99 |

TABLE 2

| Second battery cell No. | Positive electrode active material | Second substrate material | Thickness of second substrate (μm) | Thickness of second coating (μm) | Composition and mass ratio of second coating | Thickness t2 of separator (μm) | Pore diameter r2 (μm) |
|---|---|---|---|---|---|---|---|
| 2-1 | $LiNi_{0.55}Co_{0.12}Mn_{0.33}O_2$ | PE | 4 | 0.25 | AlOOH:PVDF 80 wt %: 30 wt % | 4.5 | 0.01 |
| 2-2 | $LiNi_{0.55}Co_{0.12}Mn_{0.33}O_2$ | PP/PE/PP | 15 | 3.5 | AlOOH:PVDF 50 wt %: 30 wt % | 22 | 0.03 |
| 2-3 | $LiNi_{0.55}Co_{0.12}Mn_{0.33}O_2$ | PE | 7 | 2 | AlOOH:PVDF 80 wt %: 50 wt % | 11 | 0.04 |
| 2-4 | $LiNi_{0.55}Co_{0.12}Mn_{0.33}O_2$ | PE | 7 | 2 | AlOOH:PVDF 80 wt %: 90 wt % | 11 | 1 |
| 2-5 | $LiNi_{0.55}Co_{0.12}Mn_{0.33}O_2$ | PE | 7 | 2 | AlOOH:PVDF 80 wt %: 99 wt % | 11 | 2 |
| 2-6 | $LiNi_{0.55}Co_{0.12}Mn_{0.32}Ti_{0.01}O_2$ | PE | 7 | 2 | AlOOH:PVDF 85 wt %: 85 wt % | 11 | 0.04 |
| 2-7 | $LiNi_{0.55}Co_{0.12}Mn_{0.31}Ti_{0.02}O_2$ | PE | 7 | 2 | AlOOH:PVDF 80 wt %: 80 wt % | 11 | 0.04 |
| 2-8 | $LiNi_{0.55}Co_{0.05}Mn_{0.38}Ti_{0.02}O_2$ | PE | 7 | 2 | AlOOH:PVDF 80 wt %: 70 wt % | 11 | 0.04 |
| 2-9 | $LiNi_{0.55}Co_{0.05}Mn_{0.23}Ti_{0.02}O_2$ | PE | 7 | 2 | AlOOH:PVDF 80 wt %: 60 wt % | 11 | 0.04 |

| Second battery cell No. | Porosity $\varepsilon 2$ | Tortuosity $\tau 2$ | Contact angle $\theta 1$ (radians) | Kinetic characteristic factor x2 |
|---|---|---|---|---|
| 2-1 | 40% | 2.1 | 0.67 | 0.63 |
| 2-2 | 60% | 1.1 | 1.35 | 0.55 |
| 2-3 | 55% | 1.3 | 1.12 | 1.37 |
| 2-4 | 30% | 3 | 0.43 | 21.14 |
| 2-5 | 25% | 3.9 | 0.35 | 33.30 |
| 2-6 | 40% | 2.1 | 0.67 | 1.03 |
| 2-7 | 40% | 2.1 | 0.67 | 1.03 |
| 2-8 | 40% | 2.1 | 0.67 | 1.03 |
| 2-9 | 40% | 2.1 | 0.67 | 1.03 |

Assembly of a Battery Module 6 first battery cells (denoted as A) and 3 second battery cells (denoted as B) were obtained, wherein the selected battery cells had good consistency at electrical properties such as formation capacity, charge and discharge capacity, first coulomb efficiency, impedance, self-discharge, and state of charge; and the first battery cells and the second battery cells were arranged in the order of BAAABAAAB and electrically connected in series.

Method for Testing a Low-Temperature Discharge Energy Retention Rate of the Battery Module The discharge energy retention rate of the battery module was tested in a high-low temperature box by using a charging and discharging machine. The minimum nominal capacity of each of the first battery cells and the second battery cells was C0. The battery module was discharged at a rate of 0.33 C0 to a discharge termination voltage of the single battery cell, put aside for 1 hour, then charged at the rate of 0.33 C0 until any single battery cell reached a charge termination voltage, put aside for 5 minutes, charged at a rate of 0.05 C0 until any single battery cell reached the charge termination voltage, and put aside for 1 hour. The battery module was discharged at the rate of 0.33 C0 until any single battery cell reached the discharge termination voltage, and the actual discharge capacity of the battery module was recorded as Cl. The battery module was discharged at a rate of 0.33 C1 to the discharge termination voltage of the single battery cell, put aside for 1 hour, then charged at the rate of 0.33 C1 until any single battery cell reached the charge termination voltage, put aside for 5 minutes, charged at a rate of 0.05 C1 until any single battery cell reached the charge termination voltage, and put aside for 1 hour. The battery module was put aside at a target temperature such as 0° C. for 24 hours and then discharged at the rate of 0.33 C1 until the voltage of any single battery cell reached a recommended discharge termination voltage of the product, and the voltage value shall not be less than 80% of a room temperature (25° C.) discharge termination voltage. The discharge energy was calculated. The ratio of the discharge energy of the battery module at low temperature to the discharge energy at room temperature was the low-temperature discharge energy retention rate.

Method for Testing Rate Performance of the Battery Module

The discharge energy retention rate of the battery module was tested by using a charging and discharging machine. The actual discharge capacity C1 of the battery module was first tested according to the above steps. The battery module was discharged at a rate of 0.33 C1 to the discharge termination voltage of the single battery cell, put aside for 1 hour, then charged at the rate of 0.33 C1 until any single battery cell reached the charge termination voltage, put aside for 5 minutes, charged at a rate of 0.05 C1 until any single battery cell reached the charge termination voltage, and put aside for 1 hour. The battery module was discharged at a rate of 2 C1 until any single battery cell reached the discharge termination voltage. The discharge capacity was calculated. The ratio of the discharge capacity of the battery module at 2 C1 to the discharge capacity at 0.33 C1 was the rate capacity retention rate.

According to Table 3 above, in Examples 1-10 of the present application, the thickness, pore diameter, porosity and tortuosity of the first separator of the first type of battery cells and the second separator of the second type of battery cells and the contact angle with the electrolyte were designed for optimized matching, so that the first type of battery cells and the second type of battery cells had good kinetic characteristic consistency, which can improve the normal temperature and low temperature discharge energy retention rate of the battery module, with good rate performance.

TABLE 4

| No. | First battery cell No. | Second battery cell No. | x1/x2 | Type of first coating | Discharge energy retention rate of battery module @0° C. (vs 25° C.) | Rate performance test result @2C (vs 0.33C) | Degree of wrinkles of 100% SOC negative electrode plate |
|---|---|---|---|---|---|---|---|
| Ex. 6 | 1-6 | 2-6 | 3.79 | AlOOH 85 wt % | 93.8% | 103.1% | Severe penetration |
| Ex. 11 | 1-8 | 2-6 | 23.79 | AlOOH: PVDF 85 wt %: 85 wt % | 94.9% | 104.5% | No wrinkles |
| Ex. 12 | 1-9 | 2-6 | 3.79 | AlOOH: PVDF 85 wt %: 80 wt % | 93.7% | 104.2% | No wrinkles |
| Ex. 13 | 1-10 | 2-6 | 3.79 | AlOOH: PVDF 85 wt %: 75 wt % | 93.8% | 103.8% | No wrinkles |
| Ex. 14 | 1-11 | 2-6 | 3.86 | AlOOH: PVDF 85 wt %: 70 wt % | 94.0% | 104.5% | No wrinkles |

Method for Testing the Degree of Wrinkles of a 100% SOC Negative Electrode Plate of a Battery Module The battery module was fully charged according to the above steps and put aside for 10 hours in the fully charged state, and then the single battery cells in the battery module were disassembled. The disassembled negative electrode plate was taken to observe the degree of penetration and non-penetration wrinkles of the electrode plate per unit length and unit area.

Through the above preparation method of the battery module, the first type of battery cells and the second type of battery cells with different kinetic characteristics were assembled to obtain battery modules of Examples 1-10 (Ex. 1-10) and Comparative Examples 1 and 2 (CE. 1 and 2). The battery modules of the examples and the comparative examples were tested for the discharge energy retention rate and the rate performance, and the design parameters and performance test results of the battery modules were shown in Table 3.

TABLE 3

| No. | First battery cell number | Second battery cell number | x1/x2 | Discharge energy retention rate of battery module @ 0° C. (vs 25° C.) | Rate performance test result @2C (vs 0.33C) |
|---|---|---|---|---|---|
| Ex. 1 | 1-1 | 2-1 | 0.7 | 86.9% | 100.1% |
| Ex. 2 | 1-2 | 2-1 | 8.0 | 90.7% | 101.3% |
| Ex. 3 | 1-3 | 2-1 | 5.1 | 90.2% | 100.9% |
| Ex. 4 | 1-4 | 2-2 | 15.5 | 89.1% | 100.4% |
| Ex. 5 | 1-5 | 2-3 | 7.4 | 90.9% | 102.0% |
| Ex. 6 | 1-6 | 2-6 | 3.8 | 93.8% | 103.1% |
| Ex. 7 | 1-7 | 2-7 | 87.5 | 91.4% | 102.6% |
| Ex. 8 | 1-8 | 2-8 | 23.8 | 87.8% | 101.3% |
| Ex. 9 | 1-9 | 2-9 | 3.8 | 94.3% | 103.8% |
| Ex. 10 | 1-10 | 2-9 | 3.8 | 87.5% | 101.2% |
| CE. 1 | 1-1 | 2-3 | 0.3 | 81.2% | 96.7% |
| CE. 2 | 1-7 | 2-2 | 164.2 | 80.7% | 97.2% |

According to Table 4 above, in Examples 6 and 11 to 14 of the present application, on the basis of Example 6, the coating structure and composition of the first separator of the first type of battery cells were further optimized, wherein the coating was an inorganic-organic composite coating having a thickness of 1 μm on one side (including a γ-AlOOH inorganic particle sub-coating having a thickness of 0.6 μm and a PVDF-organic particle composite sub-coating having a thickness of 0.4 μm. The specific mass ratio was shown in Table 4). By doing this, the degree of wrinkles of the negative electrode in the fully charged state can be effectively improved, and the rate performance of the battery module can be further improved.

The embodiments or implementations in this specification are described in a progressive manner, and each embodiment focuses on the differences from other embodiments, and the same or similar parts between the various embodiments can be referred to each other.

In the description of this specification, the description with reference to the terms "one embodiment", "some embodiments", "exemplary embodiments", "examples", "specific examples", or "some examples" and the like means that the specific features, structures, materials, or characteristics described in combination with the embodiments or examples are included in at least some embodiments or examples of the present application. In this specification, the schematic descriptions of the above-mentioned terms do not necessarily refer to the same embodiment or example. Moreover, the described specific features, structures, materials or characteristics may be combined in an appropriate manner in any one or more embodiments or examples.

Finally, it should be noted that the above embodiments are merely intended to describe, but not to limit, the technical solutions of the present application. Although the present application is described in detail with reference to the above embodiments, those of ordinary skill in the art should understand that various modifications may be made to the technical solutions described in the foregoing embodiments or equivalent substitutions may be made to some or all technical features thereof, and these modifications or substitutions do not make the essences of the corresponding technical solutions depart from the scope of the technical solutions of the embodiments of the present application.

What is claimed is:

1. A battery module, comprising a first type of battery cells and a second type of battery cells electrically connected at least in series, the first type of battery cells and the second type of battery cells being battery cells with different chemical systems, wherein
the first type of battery cells comprises N first battery cells,
the second type of battery cells comprises M second battery cells, N and M are positive integers,
the first battery cell comprises a first separator and a first electrolyte,
the second battery cell comprises a second separator and a second electrolyte, a kinetic characteristic factor x1 of the first battery cell is: $x1=1000\times(\varepsilon1\times r1)/(\tau1\times t1\times\theta1)$,
a kinetic characteristic factor x2 of the second battery cell is: $x2=1000\times(\varepsilon2\times r2)/(\tau2\times t2\times\theta2)$, and
x1 and x2 satisfy: $3\leq x1/x2\leq160$, where
$\varepsilon1$ and $\varepsilon2$ are respectively a porosity of the first separator and a porosity of the second separator, in %;
r1 and r2 are respectively an average pore diameter of the first separator and an average pore diameter of the second separator, in µm;
$\tau1$ and $\tau2$ are respectively a tortuosity of the first separator and a tortuosity of the second separator, as calculated by the following formula: tortuosity $\tau=\sqrt{N_m\times\varepsilon}$, where $N_m$ represents a McMullin number, and $\varepsilon$ is the porosity of the separator;
t1 and t2 are respectively an average thickness of the first separator and an average thickness of the second separator, in µm;
$\theta1$ is a contact angle between the first separator and the first electrolyte, in radians; and
$\theta2$ is a contact angle between the second separator and the second electrolyte, in radians.

2. The battery module according to claim 1, wherein the first battery cell and the second battery cell satisfy: $3\leq x1/x2\leq100$; optionally, $3\leq x1/x2\leq60$; and further optionally, $3\leq x1/x2\leq15$.

3. The battery module according to claim 1, wherein the first battery cell and the second battery cell satisfy: $0.3\leq x1\leq95$, and/or $0.2\leq x2\leq55$;
optionally, $0.5\leq x1\leq40$, and/or $0.5\leq x2\leq35$; and
further optionally, $1\leq x1\leq20$, and/or $1\leq x2\leq20$.

4. The battery module according to claim 1, wherein the average thickness t1 of the first separator and the average thickness t2 of the second separator satisfy: $4\ \mu m\leq t1\leq20\ \mu m$, and/or $8\ \mu m\leq t2\leq16\ \mu m$; and optionally, $7\ \mu m\leq t1\leq10\ \mu m$, and/or $11\ \mu m\leq t2\leq14\ \mu m$.

5. The battery module according to claim 1, wherein the average pore diameter r1 of the first separator and the average pore diameter r2 of the second separator satisfy: $0.01\ \mu m\leq r1\leq3\ \mu m$, and/or $0.01\ \mu m\leq r2\leq2\ \mu m$; and
optionally, $0.03\ \mu m\leq r1\leq1.2\ \mu m$, and/or $0.03\ \mu m\leq r2\leq1\ \mu m$.

6. The battery module according to claim 1, wherein the porosity $\varepsilon1$ of the first separator and the porosity $\varepsilon2$ of the second separator satisfy: $25\%\leq\varepsilon1\leq60\%$, and/or $25\%\leq\varepsilon2\leq60\%$; and
optionally, $30\%\leq\varepsilon1\leq50\%$, and/or $30\%\leq\varepsilon2\leq50\%$.

7. The battery module according to claim 1, wherein the tortuosity $\tau1$ of the first separator and the tortuosity $\tau2$ of the second separator satisfy: $1.1\leq\tau1\leq3.9$, and/or $1.1\leq\tau2\leq3.9$; and
optionally, $1.3\leq\tau1\leq3$, and/or $1.3\leq\tau2\leq3$.

8. The battery module according to claim 1, wherein the contact angle $\theta1$ between the first separator and the first electrolyte, and the contact angle $\theta2$ between the second separator and the second electrolyte satisfy: $0.35\leq\theta1\leq1.35$, and/or $0.35\leq\theta2\leq1.35$, in radians.

9. The battery module according to claim 1, wherein
in the first battery cell, the first separator comprises a first substrate and a first coating disposed on at least one surface of the first substrate; in the second battery cell, the second separator comprises a second substrate and a second coating disposed on at least one surface of the second substrate, and at least one of the following conditions is satisfied:
(1) the first substrate has a thickness of 3 µm to 19.5 µm; and/or the second substrate has a thickness of 4 µm to 15 µm;
(2) the first coating on one side has a thickness of 0.05 µm to 2 µm; and/or the second coating on one side has a thickness of 0.25 µm to 3.5 µm;
(3) the first coating contains inorganic particles, and the inorganic particles are one or more selected from boehmite (γ-AlOOH), aluminum oxide ($Al_2O_3$), barium sulfate ($BaSO_4$), magnesium oxide (MgO), magnesium hydroxide ($Mg(OH)_2$), silicon dioxide ($SiO_2$), tin dioxide ($SnO_2$), titanium oxide ($TiO_2$), calcium oxide (CaO), zinc oxide (ZnO), zirconium oxide ($ZrO_2$), yttrium oxide ($Y_2O_3$), nickel oxide (NiO), cerium oxide ($CeO_2$), zirconium titanate ($SrTiO_3$), barium titanate ($BaTiO_3$), and magnesium fluoride ($MgF_2$); and optionally, based on a weight of the first coating, the inorganic particles have a weight percentage of 50% to 99%, and optionally 70% to 90%; and
(4) the second coating contains organic particles, and the organic particles are one or more selected from polytetrafluoroethylene, polyvinylidene fluoride, polychlorotrifluoroethylene, polyvinylidene fluoride, modified polyvinylidene fluoride, vinylidene fluoride-hexafluoropropylene copolymer, polyethylene, polypropylene, polyacrylonitrile, polyethylene oxide, acrylate, polymethyl methacrylate, polyacrylonitrile, ethyl cellulose, copolymers of different fluorine-containing alkenyl monomer units, copolymers of fluorine-containing alkenyl monomer units and olefin-based monomer units, copolymers of fluorine-containing alkenyl monomer units and acrylic monomer units, copolymers of fluorine-containing alkenyl monomer units and acrylate monomer units, and modified compounds of the above homopolymers or copolymers; and optionally, based on a weight of the second coating, the organic particles have a weight percentage of 30% to 99%, and optionally 50% to 90%.

10. The battery module according to claim 1, wherein
a positive electrode active material for the first battery cell comprises at least one of a lithium-containing phosphate represented by formula (I) or a lithium manganese-based oxide represented by formula (II), $LiFe_{1-x2-y2}Mn_{x2}M'_{y2}PO_4$      formula (I)

$Li_{1+x3}Mn_eN_{2-e}O_{4-d}B_d$      formula (II)

wherein in formula (I), 0≤x2≤1, 0≤y2≤0.1, and M' is one or more selected from transition metal elements and non-transition metal elements other than Fe and Mn; in formula (II), −0.1≤x3≤0.2, 0<e≤2, 0≤d<1, N is one or more of Ni, Fe, Cr, Ti, Zn, V, Al, Mg, Zr and Ce, and B is one or more of S, N, F, Cl, Br and I;

optionally, the positive electrode active material for the first battery cell comprises one or more of $LiFePO_4$, $LiMnPO_4$, $LiMn_{1-x3}Fe_{x3}PO_4$, $LiV_{1-x3}Fe_{x3}PO_4$, $LiMn_2O_4$, and $LiMn_{1.9}Al_{0.1}O_4$, where x3 independently satisfies 0<x3<1; and optionally, based on 100% weight of the positive electrode active material for the first battery cell, at least one of the lithium-containing phosphate represented by formula (I) or the lithium manganese-based oxide represented by formula (II) has a weight percentage of not less than 70%.

11. The battery module according to claim 1, wherein a positive electrode active material for the second battery cell comprises a lithium transition metal oxide represented by formula (III),

  formula (III)

where −0.1≤x1≤0.2, 0.3≤a<0.95, 0<b<0.2, 0<a+b<1, 0≤y1<0.2, M is one or more selected from Mn, Fe, Cr, Ti, Zn, V, Al, Zr and Ce, and A is one or more selected from S, F, Cl and I; and optionally, 0.5≤a<0.95, and 0<b<0.15; and optionally, based on 100% weight of the positive electrode active material for the second battery cell, the lithium transition metal oxide represented by formula (III) has a weight percentage of not less than 70%.

12. A battery pack, comprising the battery module according to claim 1.

13. An electric apparatus, comprising the battery module according to claim 1, wherein the battery module can be used as a power source or an energy storage unit of the electric apparatus.

14. A method for manufacturing a battery module, comprising the following steps:

obtaining a first type of battery cells and a second type of battery cells, wherein the first type of battery cells and the second type of battery cells are battery cells with different chemical systems, the first type of battery cells comprises N first battery cells, the second type of battery cells comprises M second battery cells, N and M are positive integers, the first battery cell comprises a first separator and a first electrolyte, the second battery cell comprises a second separator and a second electrolyte, a kinetic characteristic factor x1 of the first battery cell is: $x1=1000\times(\varepsilon1\times r1)/(\tau1\times t1\times\theta1)$, a kinetic characteristic factor x2 of the second battery cell is: $x2=1000\times(\varepsilon2\times r2)/(\tau2\times t2\times\theta2)$, and x1 and x2 satisfy: 3≤x1/x2≤160, where $\varepsilon1$ and $\varepsilon2$ are respectively a porosity of the first separator and a porosity of the second separator, in %;

r1 and r2 are respectively an average pore diameter of the first separator and an average pore diameter of the second separator, in μm;

$\tau1$ and $\tau2$ are respectively a tortuosity of the first separator and a tortuosity of the second separator, as calculated by the following formula: tortuosity $\tau=\sqrt{N_m\times\varepsilon}$, where $N_m$ represents a McMullin number, and ε is the porosity of the separator;

t1 and t2 are respectively an average thickness of the first separator and an average thickness of the second separator, in μm;

θ1 is a contact angle between the first separator and the first electrolyte, in radians;

θ2 is a contact angle between the second separator and the second electrolyte, in radians; and electrically connecting the first type of battery cells and the second type of battery cells in series to form the battery module according to claim 1.

\* \* \* \* \*